(12) United States Patent
Ooi et al.

(10) Patent No.: US 8,510,441 B2
(45) Date of Patent: Aug. 13, 2013

(54) TRANSMISSION APPARATUS, TRANSMISSION METHOD, CONTENT DELIVERY SYSTEM, CONTENT DELIVERY METHOD, AND PROGRAM

(75) Inventors: Junji Ooi, Kanagawa (JP); Yutaka Hasegawa, Kanagawa (JP); Yasushi Miyajima, Kanagawa (JP); Keigo Ihara, Tokyo (JP); Takanori Nishimura, Kangawa (JP); Junko Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 2475 days.

(21) Appl. No.: 10/432,023

(22) PCT Filed: Sep. 13, 2002

(86) PCT No.: PCT/JP02/09455
§ 371 (c)(1),
(2), (4) Date: Oct. 24, 2003

(87) PCT Pub. No.: WO03/026302
PCT Pub. Date: Mar. 27, 2003

(65) Prior Publication Data
US 2004/0064510 A1    Apr. 1, 2004

(30) Foreign Application Priority Data

Sep. 18, 2001 (JP) .................................. 2001-284192
Jan. 31, 2002 (JP) .................................. 2002-023376

(51) Int. Cl.
*G06F 15/173* (2006.01)
*H04N 5/92* (2006.01)
*H04N 5/783* (2006.01)

(52) U.S. Cl.
USPC ........... 709/225; 709/223; 709/224; 709/226; 386/326; 386/343

(58) Field of Classification Search
USPC .................................. 709/203, 227, 231, 248
See application file for complete search history.

(56) References Cited

U.S. PATENT DOCUMENTS

| | | | | |
|---|---|---|---|---|
| 5,517,652 A | * | 5/1996 | Miyamoto et al. | ............ 725/115 |
| 6,006,241 A | * | 12/1999 | Purnaveja et al. | ............ 715/205 |

(Continued)

FOREIGN PATENT DOCUMENTS

| | | |
|---|---|---|
| JP | 4-356844 | 12/1992 |
| JP | 7-15707 | 1/1995 |

(Continued)

OTHER PUBLICATIONS

Definition of Apparatus found at http://www.merriam-webster.com/dictionary/apparatus.*

(Continued)

*Primary Examiner* — Backhean Tiv
(74) *Attorney, Agent, or Firm* — Oblon, Spivak, McClelland, Maier & Neustadt, L.L.P.

(57) ABSTRACT

The present invention relates to a sending apparatus that efficiently sends content provided by a viewer/listener to a sender and that performs live distribution using the content. Program content to be live-distributed by a user terminal (10) serving as the sender and sender specific information for specifying the user terminal (10) on the Internet (11) are distributed to a client terminal (12) via a streaming distribution server (13). Content provided by the client terminal (12) is directly sent to the user terminal (10) on the basis of the sender specific information. The user terminal (10) performs live distribution using the content that has been sent from the client terminal (12).

19 Claims, 27 Drawing Sheets

(56) References Cited

U.S. PATENT DOCUMENTS

| | | | |
|---|---|---|---|
| 6,041,359 A | | 3/2000 | Birdwell |
| 6,154,771 A | * | 11/2000 | Rangan et al. ............... 709/217 |
| 6,314,466 B1 | * | 11/2001 | Agarwal et al. .............. 709/231 |
| 6,449,653 B2 | * | 9/2002 | Klemets et al. .............. 709/231 |
| 6,513,069 B1 | * | 1/2003 | Abato et al. ................. 709/238 |
| 6,553,404 B2 | * | 4/2003 | Stern ........................... 709/203 |
| 6,656,888 B1 | * | 12/2003 | Zehler .......................... 508/485 |
| 6,728,753 B1 | * | 4/2004 | Parasnis et al. .............. 709/203 |
| 6,857,130 B2 | * | 2/2005 | Srikantan et al. .............. 725/93 |
| 6,871,220 B1 | * | 3/2005 | Rajan et al. ................... 709/218 |
| 6,871,234 B1 | * | 3/2005 | Minakuchi et al. ........... 709/231 |
| 7,103,668 B1 | * | 9/2006 | Corley et al. ................. 709/231 |
| 7,150,017 B1 | * | 12/2006 | Vogl et al. .................... 718/102 |
| 7,213,075 B2 | * | 5/2007 | Feig .............................. 709/231 |
| 7,305,449 B2 | * | 12/2007 | Simpson et al. .............. 709/207 |
| 7,330,875 B1 | * | 2/2008 | Parasnis et al. .............. 709/204 |
| 7,430,595 B2 | * | 9/2008 | Morita et al. ................. 709/223 |
| 2002/0047916 A1 | * | 4/2002 | Miyagi et al. ............. 348/384.1 |
| 2002/0116716 A1 | * | 8/2002 | Sideman ........................ 725/91 |
| 2002/0138552 A1 | * | 9/2002 | DeBruine et al. ............. 709/203 |

FOREIGN PATENT DOCUMENTS

| | | |
|---|---|---|
| JP | 2000-137752 | 5/2000 |
| JP | 2000-152201 | 5/2000 |
| JP | 2001-45463 | 2/2001 |
| JP | 2001-101117 | 4/2001 |
| JP | 2001-148841 | 5/2001 |
| JP | 2001-242775 | 9/2001 |
| WO | WO 00/40024 | 7/2000 |
| WO | WO 01/45406 | 6/2001 |
| WO | WO 03/026302 A1 | 3/2003 |

OTHER PUBLICATIONS

Definition of network interface found at http://java.sun.com/docs/books/tutorial/networking/nifs/definition.html.*

Patent Abstracts of Japan, JP 2000-152201, May 30, 2000 (reference previously filed in Japanese language on Dec. 8, 2003).

European Office Action mailed on Dec. 21, 2010, issued for EP Application No. 02 765 545.5 (English).

* cited by examiner

TRANSMISSION APPARATUS, TRANSMISSION METHOD, CONTENT DELIVERY SYSTEM, CONTENT DELIVERY METHOD, AND PROGRAM

TECHNICAL FIELD

The present invention relates to a content distribution system that includes a plurality of computers and a server apparatus, which are connected to a network, and that distributes content generated by a first computer serving as a sender via the server apparatus to viewers/listeners' computers, to a content distribution method, and to a content sending program that implements the content distribution system.

BACKGROUND ART

The so-called Internet has been widely used as a computer network containing many computers connected thereto. The Internet enables computers to freely transfer various pieces of information with each other using various protocols (interconnection procedures), a typical example of which is TCP/IP (Transmission Control Protocol/Internet Protocol).

Distribution of a moving image captured by an image capturing device, such as a digital video camera, to many viewers/listeners using the Internet is made possible by the following methods.

Specifically, a first method involves uploading a file containing the moving image from a sender's computer to a server apparatus and, in response to a download request issued by another computer to the server apparatus, making the transferred file downloadable. This enables a viewer/listener to download, using a computer connected to the Internet, the moving image file from the server apparatus and browse the moving image on a display screen of the computer.

A second method involves preparing a server apparatus by the sender of the moving image and storing the file containing the moving image in a downloadable state. As in the first method, the server apparatus can distribute the moving image to the viewer/listener's computer.

In such a case that the sender prepares the server apparatus, an edited and completed moving image file can be distributed. Connecting the image capturing device to the server apparatus or the sender's computer connected to the server apparatus allows live distribution of the moving image captured by the image capturing device in real-time.

Such live distribution is realized using various streaming distribution techniques, that is, techniques for sequentially playing moving image data stored in the server apparatus while simultaneously downloading the moving image data via the computer network. Examples of the streaming distribution techniques include "Real System" from Real Networks, Inc., "QuickTime Streaming Server" from Apple Computer, Inc., and "Windows Media Technology" from Microsoft, Inc.

Live distribution of a moving image or the like to viewers/listeners via a network in the above-described manner is limited in that only a single sender is allowed for one live distribution. Such live distribution is incapable of distribution that involves importing a moving image supplied from another provider at a remote place, away from the sender, into a program being distributed live and connecting a plurality of locations by relay technology.

For example, reflecting messages and opinions from viewers/listeners in a program to be distributed live involves a system other than a system that performs live distribution. More specifically, for example, messages and opinions from viewers/listeners are obtained in the form of characters and still images using application software that realizes email and chat, and the obtained characters and still images are read into the system that performs live distribution. Alternatively, messages and opinions need to be exchanged using application software that realizes email and chat at the same time as the operation of the system that performs live distribution.

In order to perform live distribution while exchanging messages and opinions with viewers/listeners by the above-described methods, a plurality of pieces of application software that have little relevance to one another need to be operated, resulting in a complicated operation. Chat messages whose contents have little relevance to the live-distributed moving image cannot be avoided. The sender of the moving image and the viewers/listeners have difficulty in smoothly exchanging messages and opinions with each other. When the live-distributed moving image is recorded, a single program cannot be realized only by that moving image.

In view of the background circumstances described above, it is an object of the present invention to provide a sending apparatus, a sending method, a content distribution system, a content distribution method, and a program therefor for enabling a sender to freely use content such as a moving image, still image, or text provided by a viewer/listener.

DISCLOSURE OF INVENTION

A sending apparatus of the present invention is a sending apparatus connected via a network to a server apparatus that distributes content and a plurality of viewing/listening apparatuses that receive the content distributed by the server apparatus, including:
  communication means for communicating with another apparatus via the network; and
  control means for generating the content to be distributed to the viewing/listening apparatuses via the server apparatus,
  wherein the control means obtains first content to be distributed to the viewing/listening apparatuses via the server apparatus; directly obtains, from another apparatus connected to the network, second content to be distributed to the viewing/listening apparatuses via the server apparatus; using the first content and the second content, generates transmission content to be sent to the server apparatus; and sends the transmission content via the communication means to the server apparatus.

A sending method of the present invention is a sending method for distributing content to a plurality of viewing/listening apparatuses via a server apparatus that distributes the content, including:
  a step of obtaining first content to be distributed to the viewing/listening apparatuses via the server apparatus; a step of obtaining, from another apparatus connected to the network, second content to be distributed to the viewing/listening apparatuses via the server apparatus; a step of generating, using the first content and the second content, transmission content to be sent to the server apparatus; and a step of sending the transmission content to the server apparatus.

A program of the present invention is a program for instructing an apparatus connected via a network to a server apparatus that distributes content and a plurality of viewing/listening apparatuses that receive the content distributed by the server apparatus to perform a content sending process, the program comprising:
  controlling to obtain first content to be distributed to the viewing/listening apparatuses via the server apparatus;

controlling to obtain, from another apparatus connected to the network, second content to be distributed to the viewing/listening apparatuses via the server apparatus; controlling to generate, using the first content and the second content, transmission content to be sent to the server apparatus; and controlling to send the transmission content to the server apparatus.

A content distribution system of the present invention is a content distribution system connected to a plurality of viewing/listening apparatuses via a network, including:

distribution means for distributing content to the plurality of viewing/listening apparatuses; and generation means for generating the content to be distributed to the viewing/listening apparatuses via the distribution means, wherein the generation means obtains first content to be distributed to the viewing/listening apparatuses via the distribution means; directly obtains, from another apparatus connected to the network, second content to be distributed to the viewing/listening apparatuses via the distribution means; and, using the first content and the second content, generates distribution content to be distributed to the viewing/listening apparatuses via the distribution means, and wherein the distribution means distributes the distribution content generated by the generation means to the plurality of viewing/listening apparatuses.

A content distribution method of the present invention is a content distribution method for distributing content in a content distribution system including distribution means for distributing the content to a plurality of viewing/listening apparatuses and generation means for generating the content to be distributed to the viewing/listening apparatuses via the distribution means, the content distribution method including:

a step of obtaining first content to be distributed to the viewing/listening apparatuses via the distribution means; a step of directly obtaining, from another apparatus connected to the network, second content to be distributed to the viewing/listening apparatuses via the distribution means; a step of generating, using the first content and the second content, distribution content to be distributed to the viewing/listening apparatuses via the distribution means; and a step of distributing the distribution content generated by the generation means to the plurality of viewing/listening apparatuses.

A program of the present invention is a program for instructing a system including distribution means for distributing content to a plurality of viewing/listening apparatuses and generation means for generating the content to be distributed to the viewing/listening apparatuses via the distribution means to perform a content distribution process including:

obtaining first content to be distributed to the viewing/listening apparatuses via the distribution means; directly obtaining, from another apparatus connected to the network, second content to be distributed to the viewing/listening apparatuses via the distribution means; generating, using the first content and the second content, distribution content to be distributed to the viewing/listening apparatuses via the distribution means; and distributing the distribution content generated by the generation means to the plurality of viewing/listening apparatuses.

BEST MODE FOR CARRYING OUT THE INVENTION

Embodiments of the present invention will now be described in detail with reference to the drawings. The present invention is suitably applicable to a case in which, using a plurality of computers and a server apparatus connected to a computer network, content generated by a first computer serving as a sender is distributed to viewers/listeners' computers via the server apparatus. The configuration of a basic system that distributes the content in this manner will be schematically described.

(1) Basic Configuration of Content Distribution System

Figure 1:
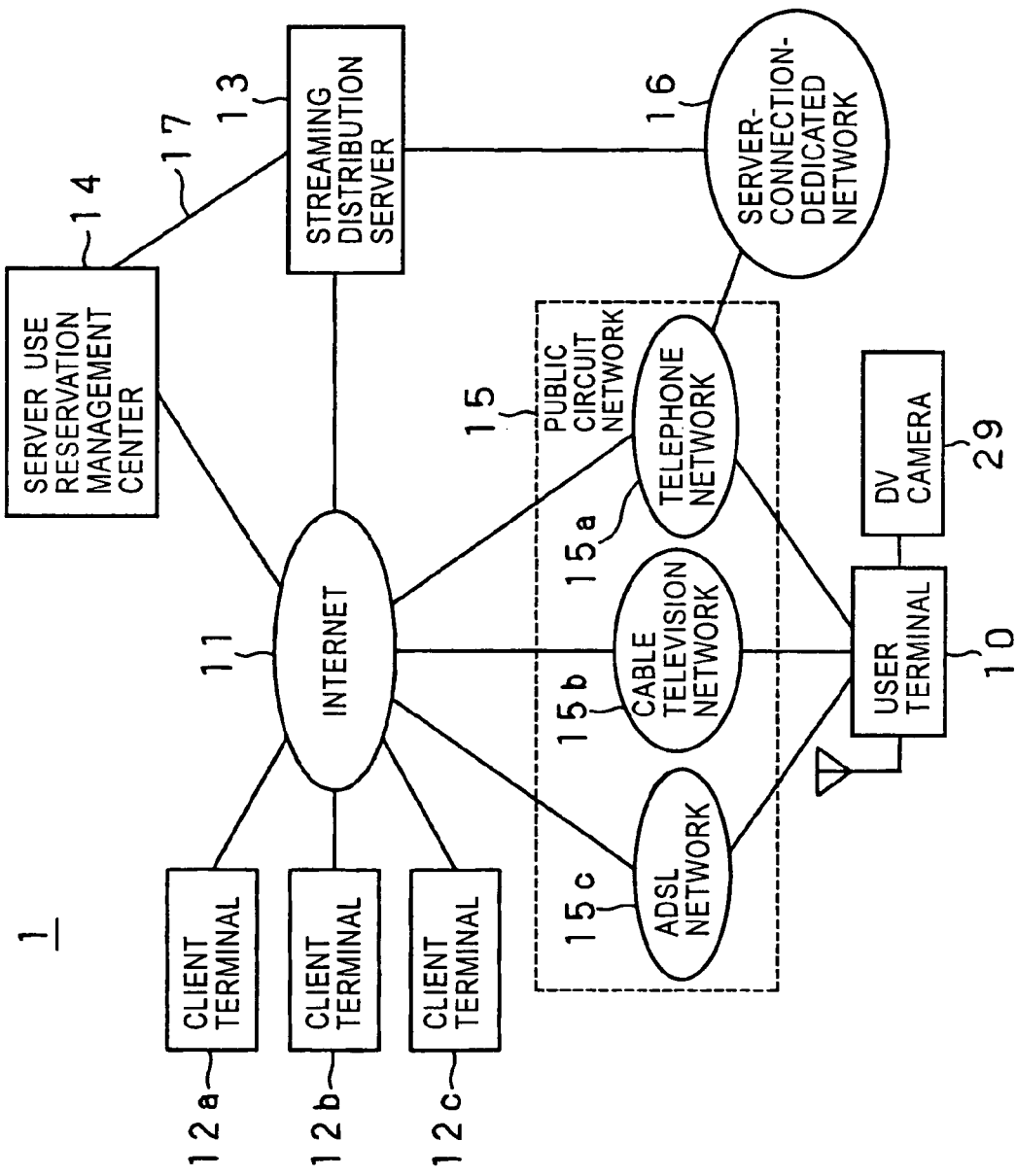
FIG. 1 is a schematic diagram showing the basic configuration of the entirety of a content distribution system according to an embodiment of the present invention.

A content distribution system 1 described in this example performs, for example, as shown in FIG. 1, live distribution of content to a plurality of client terminals 12a, 12b, 12c, . . . via a computer network such as the Internet 11. The content includes video data or audio data captured by a user terminal 10 including a personal computer with a digital video camera (DV camera) included therein or connected thereto or text data input from an input unit such as a keyboard of the user terminal 10.

The user terminal 10 and the client terminals 12a, 12b, 12c, . . . described here are personal computers, PDAs (Personal Digital Assistants), cellular phones with communication functions, or the like. The content to be distributed may be pre-edited video data, audio data, or text data stored in the user terminal 10.

In the content distribution system 1, the user terminal 10 has a multi-window function for simultaneously displaying a plurality of windows on a display screen. In particular, the user terminal 10 enables a user to seamlessly move between a window serving as a main window that is displayed on the display screen according to each function of an application program executed when performing content distribution and a window serving as a setting window on which the user performs various settings, thereby clarifying the association between the main window and the setting window and providing the user with an easy-to-understand interface. More specifically, the user terminal 10 introduces the concept of panel windows, which are generated by vertically dividing the main window according to each function on the display screen, in order to represent tasks of various functions on the display screen. This contributes to the implementation of a personal casting service with easy operation.

Prior to a detailed description of the user terminal 10, the basic overall configuration of the content distribution system 1 will now be described.

As shown in FIG. 1, the content distribution system 1 includes the user terminal 10 that distributes content, the plurality of client terminals 12a, 12b, 12c, . . . that receive and view/listen to the content distributed by the user terminal 10, a server use reservation management center 14 that manages reservation information for enabling the user terminal 10 to use a content distribution function provided by a streaming distribution server 13 described below, and the streaming distribution server 13 that distributes the content distributed by the user terminal 10 to the plurality of client terminals 12a, 12b, 12c, . . . .

The user terminal 10 has the digital video camera included therein or connected thereto. Video data or audio data captured by the digital video camera is sent while being compressed in real time on the basis of a predetermined encoding format. The user terminal 10 can also send, for example, pre-edited video data or audio data recorded in a recording unit such as a hard disk.

Specifically, the user terminal 10 is in such an environment that the user terminal 10 is connectable to the Internet 11 via an ISP (Internet Service Provider) (not shown) and a public circuit network 15 including a telephone network 15a, a cable television network 15b, or an ADSL (Asymmetric Digital Subscriber Line) network 15c. The connection may be wired or wireless as long as the user terminal 10 is connectable to the Internet 11. For example, the user terminal 10 may connect to the Internet 11 via a so-called personal handyphone system (hereinafter referred to as a PHS) or the like.

Prior to sending content, the user terminal 10 needs to make a reservation for content distribution at the server use reservation management center 14. The user terminal 10 accesses the server use reservation management center 14 via the public circuit network 15 and the Internet 11 and makes a reservation by registering predetermined reservation information including a preferred date and time for using a content streaming distribution function provided by the streaming distribution server 13, the fixed number of viewers/listeners, and a viewer/listener password.

After the reservation has been accepted, the user terminal 10 sends the content to the streaming distribution server 13 via the public circuit network 15 and the Internet 11. The user terminal 10 establishes, for example, a PPP (Point to Point Protocol) connection with an access port of a server-connection-dedicated network 16 via the public circuit network 15, thereby establishing a transmission path to the streaming distribution server 13. Accordingly, the user terminal 10 can send the content to the streaming distribution server 13 via the transmission path. If necessary, the user terminal 10 may record the sent content in a recording unit such as a hard disk.

The client terminals 12a, 12b, 12c, . . . are information processing apparatuses, such as personal computers or PDAs, which are in such an environment that they can connect to the Internet 11. By inputting predetermined information such as the viewer/listener password, the client terminals 12a, 12b, 12c, . . . each participate as a viewing/listening terminal in the content distribution system 1. At a content distribution start date and time that has been reserved and registered by the user terminal 10, content is distributed from the streaming distribution server 13 via the Internet 11 to each of the client terminals 12a, 12b, 12c, . . . . Each of the client terminals 12a, 12b, 12c, . . . receives the distributed content, decodes the received content in real time, and outputs the content using a display screen, speaker, or the like.

The server use reservation management center 14 manages reservation information for enabling the user terminal 10 to use the content streaming distribution function provided by the streaming distribution server 13. When the predetermined reservation information is registered by the user terminal 10, the server use reservation management center 14 reserves the use of the streaming distribution server 13 by the user terminal 10. The server use reservation management center 14 is connected to the streaming distribution server 13 via a leased line 17. When authenticating the user terminal 10 and the client terminals 12a, 12b, 12c, . . . , the server use reservation management center 14 exchanges authentication data with the streaming distribution server 13 via the leased line 17.

The streaming distribution server 13 receives the content that has been sent from the user terminal 10 via the Internet 11 or the server-connection-dedicated network 16 and performs streaming distribution of the content via the Internet 11 to the client terminals 12a, 12b, 12c, . . . . At the same time, the streaming distribution server 13 is connected to the server use reservation management center 14 via the leased line 17. When authenticating the user terminal 10 and the client terminals 12a, 12b, 12c, . . . , the streaming distribution server 13 exchanges authentication data with the server use reservation management center 14 via the leased line 17. At a content distribution start date and time reserved and registered by the user terminal 10, the streaming distribution server 13 receives the content that has been sent from the user terminal 10 via the Internet 11 or the server-connection-dedicated network 16, stores the content in a buffer (not shown) and simultaneously reads the content from the buffer, and thus distributes the content to the client terminals 12a, 12b, 12c, . . . that have issued a distribution request.

In the content distribution system 1 described above, the user serving as the distributor of the content accesses the server use reservation management center 14 via the user terminal 10 and registers the above-described reservation information, thereby making a reservation for live distribution of the content.

More specifically, in the content distribution system 1, the display screen of the user terminal 10 displays a WWW (World Wide Web) browsing window of a web site that provides services of the content distribution system 1. The user performs user registration at the content distribution system 1 via the user terminal 10 and logs in to the content distribution system 1 by inputting a given user ID (IDEntification) and password. Accordingly, the display screen of the user terminal 10 displays a predetermined window for making a reservation for content distribution.

The user inputs the predetermined reservation information via the window displayed on the display screen of the user terminal 10. When user authentication succeeds as a result of inputting a credit card number or the like, live distribution of the content at the specified date and time is reserved. In the content distribution system 1, when the reservation for the live distribution is accepted, a reservation setting file is downloaded from the server use reservation management center 14 to the user terminal 10. The reservation setting file includes the preset reservation information, an IP (Internet Protocol) address and port of the streaming distribution server 13 that performs the live distribution, user ID, password, and the like.

In the content distribution system 1, a live distribution application program (described below) is executed by the user terminal 10 to automatically read these pieces of information, thereby performing the live distribution without requiring the user to perform complicated settings.

In the content distribution system 1, the user terminal 10 obtains confirmation of reservation, that is, confirmation whether or not to actually perform the reserved live distribution, from the server use reservation management center 14 a predetermined time, such as approximately three hours, before the distribution start date and time. Specifically, in the content distribution system 1, the user terminal 10 displays on the display screen the WWW browsing window for accessing the server use reservation management center 14. When the user inputs predetermined information on the window, confirmation of reservation is obtained. In the content distribution system 1, the user must inform beforehand, that is, prior to the distribution start date and time, desired clients (those who are requested by the user to view/listen to the content) of information such as the viewer/listener password necessary for viewing/listening to the content.

In the content distribution system 1, the user terminal 10 establishes a connection with the streaming distribution server 13 a predetermined time, such as approximately five minutes, before the distribution start date and time. At the distribution start date and time, the user terminal 10 captures video data or audio data by the digital video camera included therein or connected thereto. Simultaneously, the user terminal 10 sends the video data or audio data to the streaming distribution server 13 while compressing the video data or audio data in real time on the basis of the predetermined encoding format. In the content distribution system 1, clients serving as viewers/listeners can receive and view/listen to the content via the client terminals 12a, 12b, 12c, . . . by inputting predetermined information such as the viewer/listener password or the like.

As discussed above, the content distribution system 1 live-distributes the content via the Internet 11 to the client terminals 12a, 12b, 12c, . . . . The content includes the video data or audio data captured by the user terminal 10, pre-edited video data or audio data stored in the user terminal 10, text data input using the input unit of the user terminal 10, or the like. In other words, the content distribution system 1 implements the so-called personal casting service that enables an individual user to live-distribute the content to a plurality of viewers/listeners.

In the content distribution system 1, after the above-described live distribution reservation is made and the settings are done by the user terminal 10, prior to the start of the actual distribution, an effect group necessary for a program and an archive file group recorded in the hard disk of the user terminal 10 or the like can be set and registered in advance. The user terminal 10 performs various settings using a predetermined guide function. In the content distribution system 1, other than the reserved time, the user terminal 10 can perform test capturing of content to be live-distributed using the recording unit such as the hard disk or the like. As in the actual distribution, the user terminal 10 may apply various effects to the content or may switch between the video data or audio data obtained as a result of capturing an image by the digital video camera serving as a selectable input source and the video data or audio data recorded in the hard disk.

In the content distribution system 1, in a state in which the connection between the user terminal 10 and the streaming distribution server 13 has been established and the content has been live-distributed, when the user performs operation to add an effect, switch a file, or the like, such operation is reflected in a stream being distributed in accordance with the operation. Consequently, such operation is reflected in the display screen of each of the client terminals 12a, 12b, 12c, . . . .

In the content distribution system 1, at the distribution end time, the content distribution is automatically terminated, and the program is terminated on the display screen of each of the client terminals 12a, 12b, 12c, . . . . In the content distribution system 1, information concerning the content that has been completely distributed is recorded in the recording unit such as the hard disk of the user terminal 10 in an album format. The user terminal 10 can read and browse the details of a distribution record and the distributed content.

(2) Configuration of User Terminal

The configuration of the user terminal 10 included in the content distribution system 1 described above will now be described. In order to simplify the description, a description will be given of the user terminal 10 that includes a digital video camera. Alternatively, a digital video camera serving as an external unit may be connected by wire or wirelessly to the user terminal 10. Alternatively, for example, the user terminal 10 may use a digital video camera that is directly connectable to a computer network such as LAN (Local Area Network) to which the user terminal 10 is connected and obtains and load image data or audio data that is captured by the digital video camera into the user terminal 10 via the computer network.

Figure 2:
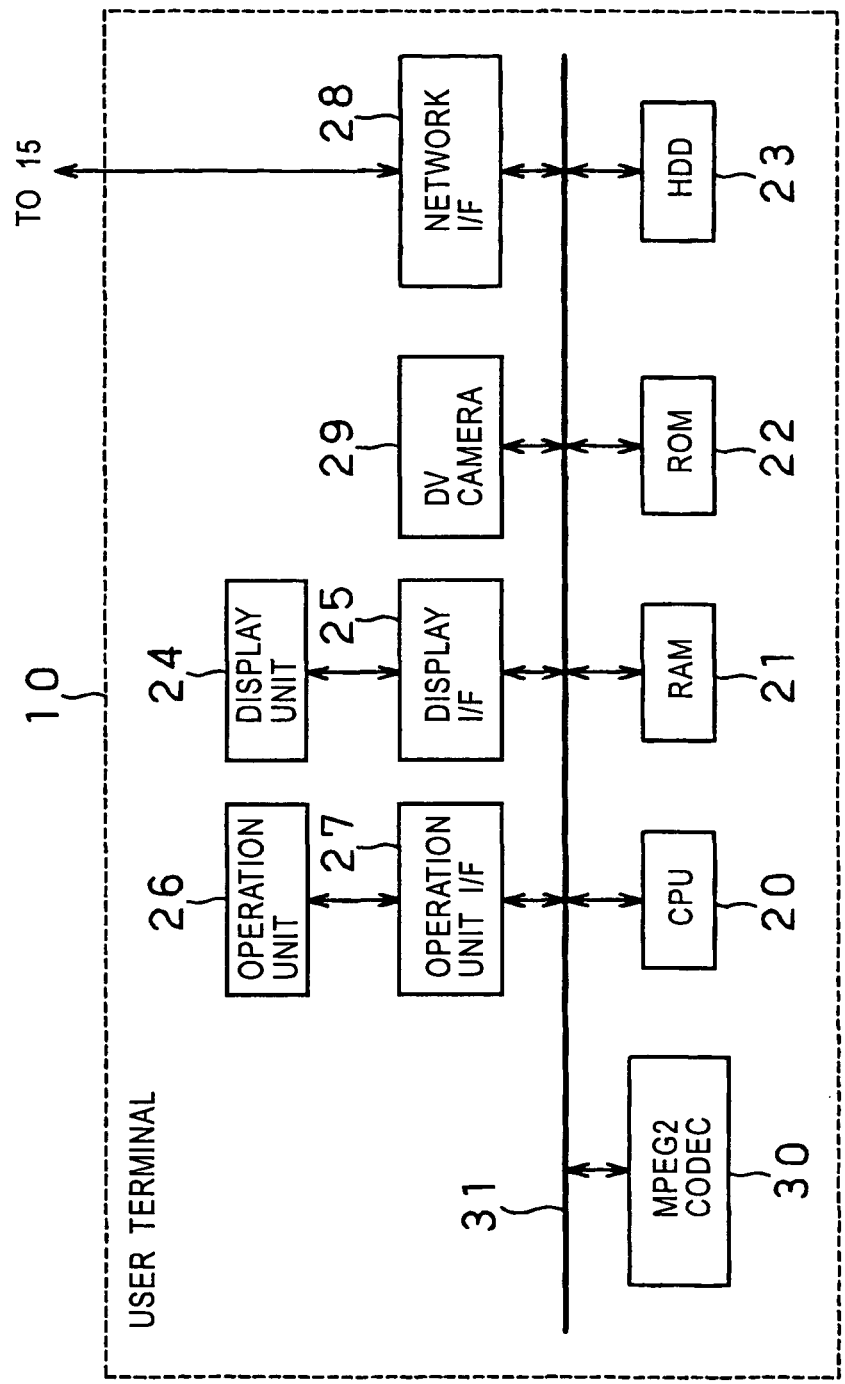
FIG. 2 is a functional block diagram showing the configuration of a user terminal used in the content distribution system.

As shown in FIG. 2, the user terminal 10 includes a CPU (Central Processing Unit) 20 that executes various arithmetic operations and that controls each component; a RAM (Random Access Memory) 21 that functions as a work area for the CPU 20; a ROM (Read Only Memory) 22 that stores information including various programs executed by the CPU 20; an HDD (Hard Disk Drive) 23 that records various programs such as an operating system and application programs executed by the CPU 20 and that reads/writes various pieces of data including content to be distributed; a display unit 24 that displays various pieces of information; a display interface 25 that enables data exchange between the display unit 24 and the CPU 20; an operation unit 26 for inputting, by the user, various pieces of information, instructions, and operations; an operation interface 27 for enabling data exchange between the operation unit 26 and the CPU 20; a network interface 28 that enables data exchange with an external unit connected to the Internet 11 or the server-connection-dedicated network 16 via the above-described public circuit network 15; a digital video camera 29 that captures an image of a subject and obtains video data or audio data; and an MPEG2 codec 30 that performs compression encoding and decoding based on so-called MPEG2 (Moving Picture Experts Group phase 2).

In the user terminal 10, of these-components, the CPU 20, RAM 21, ROM 22, HDD 23, display interface 25, operation interface 27, network interface 28, digital video camera 29, and MPEG2 codec 30 are connected to one another via a bus 31.

The digital video camera 29 in the user terminal 10 may not be included in the user terminal 10. Instead, for example, the digital video camera 29 may be connected to the bus 31 via a predetermined interface for establishing a connection with an external unit, the network interface 28, or the like. If necessary, in addition to the HDD 23, for example, a removable read/write unit that reads/writes data from/to a removable recording medium is included in or connected to the user terminal 10. Various pieces of data may be written and read by this read/write unit.

The CPU 20 is connected via the bus 31 to the RAM 21, ROM 22, HDD 23, display interface 25, operation interface 27, network interface 28, digital video camera 29, and MPEG2 codec 30. The CPU 20 controls each component and executes the operating system and various application programs recorded in the HDD 23 or the like. In particular, the CPU 20 processes and controls the making of a reservation for content distribution at the server use reservation management center 14, the sending of content to the streaming distribution server 13, and the recording of the sent content in the HDD 23.

The RAM 21 functions as a work area for the CPU 20 when the CPU 20 executes various programs. Under the control of the CPU 20, the RAM 21 temporarily stores various pieces of data.

The ROM 22 stores various programs and setting information necessary for activation of the user terminal 10. The various programs and setting information stored in the ROM 22 are read upon activation of the user terminal 10 and used by the CPU 20.

Under the control of the CPU 20, the HDD 23 reads/writes various programs such as the operating system and application programs, data, and the like. Also, the HDD 23 can record the sent content. Also, the HDD 23 can record pre-edited content, and, under the control of the CPU 20, can read the content at the time of distribution.

The display unit 24 is formed of, for example, an LCD (Liquid Crystal Display). Under the control of the CPU 20, the display unit 24 displays various pieces of information such as data recorded in the HDD 23 on the display screen. In particular, under the control of the CPU 20, the display unit 24 displays on the display screen predetermined graphical user interfaces including the WWW browsing window for accessing the server use reservation management center 14 and the streaming distribution server 13 and predetermined windows for executing various application programs for performing various processes including the processing of content to be sent.

The display interface 25 enables data exchange between the CPU 20 and the display unit 24. In other words, the display interface 25 supplies various pieces of information supplied from the CPU 20 via the bus 31 to the display unit 24.

The operation unit 26 accepts user operations using a user interface including, for example, a pointing device, such as a keyboard or a mouse, or a rotational operation switch, such as a so-called jog dial, and supplies a control signal indicating the operation details to the CPU 20 via the operation interface 27.

The operation interface 27 enables data exchange between the CPU 20 and the operation unit 26. In other words, the operation interface 27 supplies the control signal supplied from the operation unit 26 via the bus 31 to the CPU 20.

Under the control of the CPU 20, the network interface 28 functions as an external communication interface. In other words, the network interface 28 is provided to enable data exchange between the user terminal 10 and an external unit connected to the Internet 11 or the server-connection-dedicated network 16 via the public circuit network 15. In particular, under the control of the CPU 20, the network interface 28 externally sends content and sends/receives various pieces of information including the above-described reservation information, a reservation ID, and the like.

The digital video camera 29 is formed of a predetermined optical system for capturing an image of a subject, a photoelectric transducer such as a CCD (Charge Coupled Device), and the like. Video data or audio data obtained as a result of capturing the image by the digital video camera 29 is supplied, under the control of the CPU 20, via the bus 31 to the MPEG2 codec 30.

Under the control of the CPU 20, the MPEG2 codec 30 compresses and encodes the video data or audio data supplied from the digital video camera 29 via the bus 31 on the basis of the MPEG2 format. Under the control of the CPU 20, the MPEG2 codec 30 compresses and encodes the video data or audio data in real time. Also, the MPEG2 codec 30 can decode the compressed and encoded data on the basis of the MPEG2 format.

(3) Live Distribution Application Program

The live distribution application program executed by the above-described user terminal 10 will now be described. The live distribution application program consists of a series of program groups freely combining a plurality of modules that realize individual functions. For example, the live distribution application program is recorded in the HDD 23 of the user terminal 10. The user terminal 10 performs live distribution of content by executing, by the CPU 20, the live distribution application program. The live distribution application program may be provided by a predetermined recording medium, such as a so-called compact disc, or a transmission medium, such as the Internet.

Figure 3:
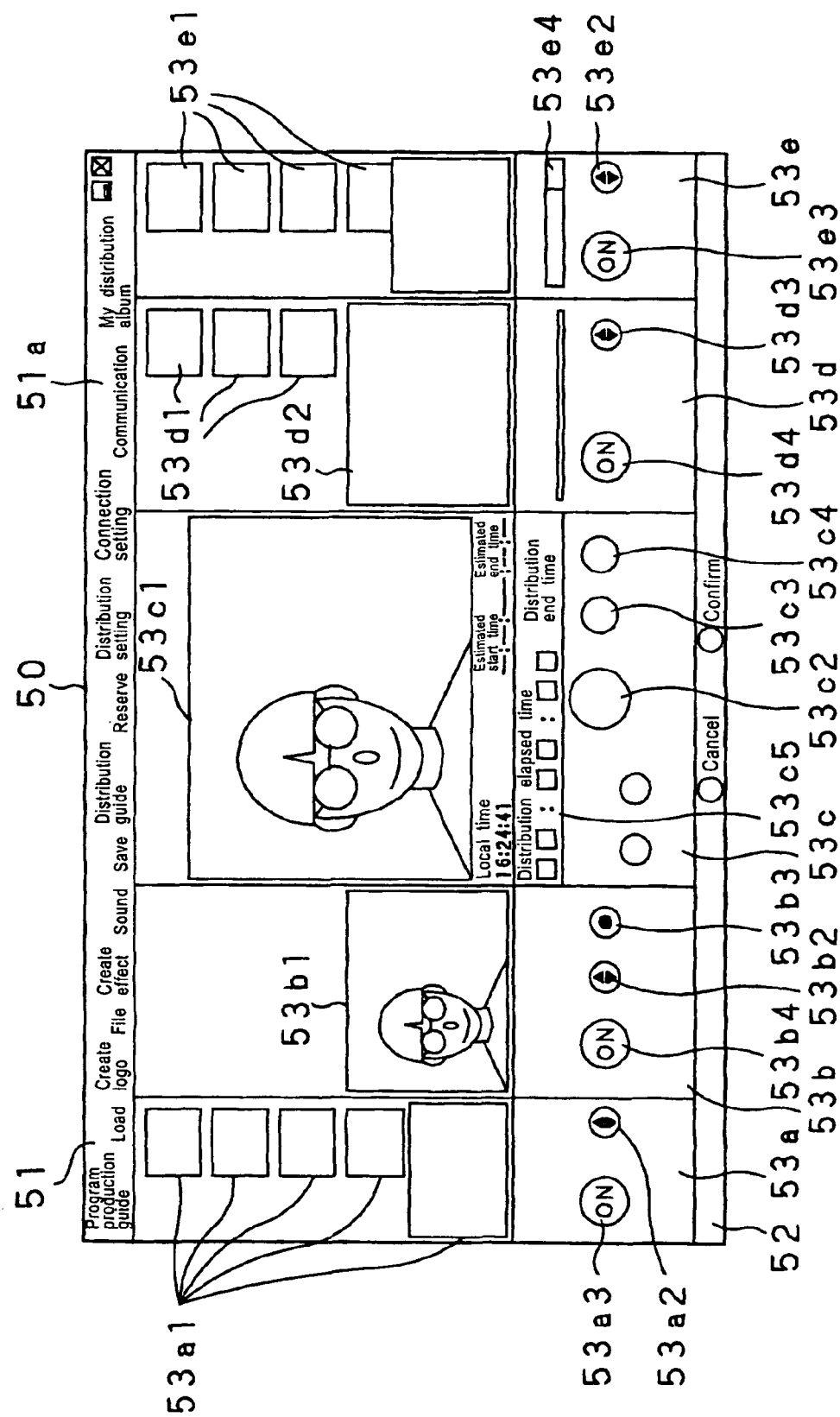
FIG. 3 is a schematic diagram showing a main window displayed by a live distribution application program executed by the user terminal in the content distribution system.

Execution of the live distribution application program enables the display unit 24 of the user terminal 10 to display, for example, a window such as that shown in FIG. 3.

The window includes, as shown in FIG. 3, on a main window 50 created by a main module serving as the backbone of the live distribution application program, a guidance bar 51 and a status bar 52 created by the main module and a plurality of panel windows 53a, 53b, 53c, 53d, and 53e created by corresponding functional modules.

The main window 50 includes the guidance bar 51 in the shape of a horizontal strip at the top thereof and the status bar 52 in the shape of a horizontal strip at the bottom thereof. The plurality of panel windows 53a, 53b, 53c, 53d, and 53e, which are separate horizontal windows according to the corresponding functions, are disposed between the guidance bar 51 and the status bar 52 and displayed on the display unit 24. Each of the panel windows 53a, 53b, 53c, 53d, and 53e is implemented as a single independent window.

In FIG. 3, the following panel windows are displayed including the sound panel window 53a for performing sound-related operations; the camera input panel window 53b for performing operations related to video data obtained as a result of capturing an image by the digital video camera 29 serving as a selectable input source; the main monitor panel window 53c for performing operations related to content being distributed live; the file input panel window 53d for performing operations related to video data recorded in the HDD 23 serving as a selectable input source; and the effect panel window 53e for performing operations related to effects applied to content to be distributed.

The guidance bar 51 implements a plurality of buttons for inputting instructions for various operations. The user clicks the buttons displayed in the guidance bar 51 with the mouse to perform various operations on the live distribution application program.

The status bar 52 implements areas for displaying, for example, the state of radio waves when the above-described PHS is used to connect to the Internet 11, the connection state when the above-described PPP connection is established, the remaining charge of a battery included in the user terminal 10, or the remaining capacity of the HDD 23.

The sound panel window 53a includes a plurality of icons 53a1 for displaying a list of audio/music data such as wav files registered to be played as background music during live distribution, a button 53a2 for selecting one of these icons, a button 53a3 for playing or stopping the audio/music data corresponding to the selected icon, and the like. In the sound panel window 53a, other audio/music data can be freely added to the list, or the audio/music data registered in the list can be deleted.

The camera input panel window 53b implements a preview area 53b1 that displays a preview image for previewing video data obtained as a result of image capturing by the digital video camera 29 serving as a selectable input source; a button 53b2 for setting the input source to the video data obtained as a result of image capturing by the digital video camera 29; a button 53b3 for applying so-called after-recording, that is, combining audio data obtained as a result of image capturing by the digital video camera 29 with video data recorded in the HDD 23 serving as a selectable input source; a button 53b4 for activating a setting application program for the digital video camera 29; and the like.

The main monitor panel window 53c implements a preview area 53c1 for previewing content to be distributed live, a button 53c2 for starting the test capturing or the actual distribution, a button 53c3 for pausing the playing or distribution of the content, a button 53c4 for muting the audio data, a time display area 53c5 that displays the distribution elapsed time or the remaining time, and the like.

The file input panel window 53d implements thumbnail areas 53d1 that display thumbnail images for showing a list of pieces of video data recorded in the HDD 23 serving as a selectable input source, a preview area 53d2 that displays a preview image for previewing the video data, a button 53d3 for selecting one thumbnail image from among the thumbnail images in the list, a button 53d4 for playing or stopping the video data corresponding to the selected thumbnail image, and the like.

The effect panel window 53e implements thumbnail areas 53e1 that display thumbnail images for showing a list of various effect materials to be applied to content being distributed live, a button 53e2 for selecting one of the thumbnail images, a button 53e3 for executing or canceling the effect corresponding to the selected thumbnail image, a box 53e4 in which the user inputs a character string to be displayed as a caption in real time to serve as an effect on the video data, and the like. In the effect panel window 53e, another effect material can be added to the list, or the effect material registered in the list can be deleted.

As discussed above, in order to show tasks of various functions, the user terminal 10 displays on the display unit 24 the separate vertical panel windows 53a, 53b, 53c, 53d, and 53e corresponding to the functions. This enables the user to intuitively and easily detect the association between the operations according to each function and the necessary button group. For example, when the user wants to perform an effect-related operation, the user is only required to pay attention to the effect panel window 53e.

Using the above-described live distribution application program, the user terminal 10 freely combines video data, audio data, text data, and the like to create content to be distributed. The created content is sent to the streaming distribution server 13 via the Internet 11 or the server-connection-dedicated network 16. The streaming distribution server 13 distributes the content to the client terminals 12a, 12b, 12c, . . . .

(4) Content Distribution System for Obtaining Content from Viewer/Listener

On the basis of the basic configuration of the content distribution system 1 described above, a case in which the user terminal 10 directly obtains content from a client terminal serving as a viewer/listener and performs live distribution using the obtained content will now be described with reference to FIG. 4.

Figure 4:
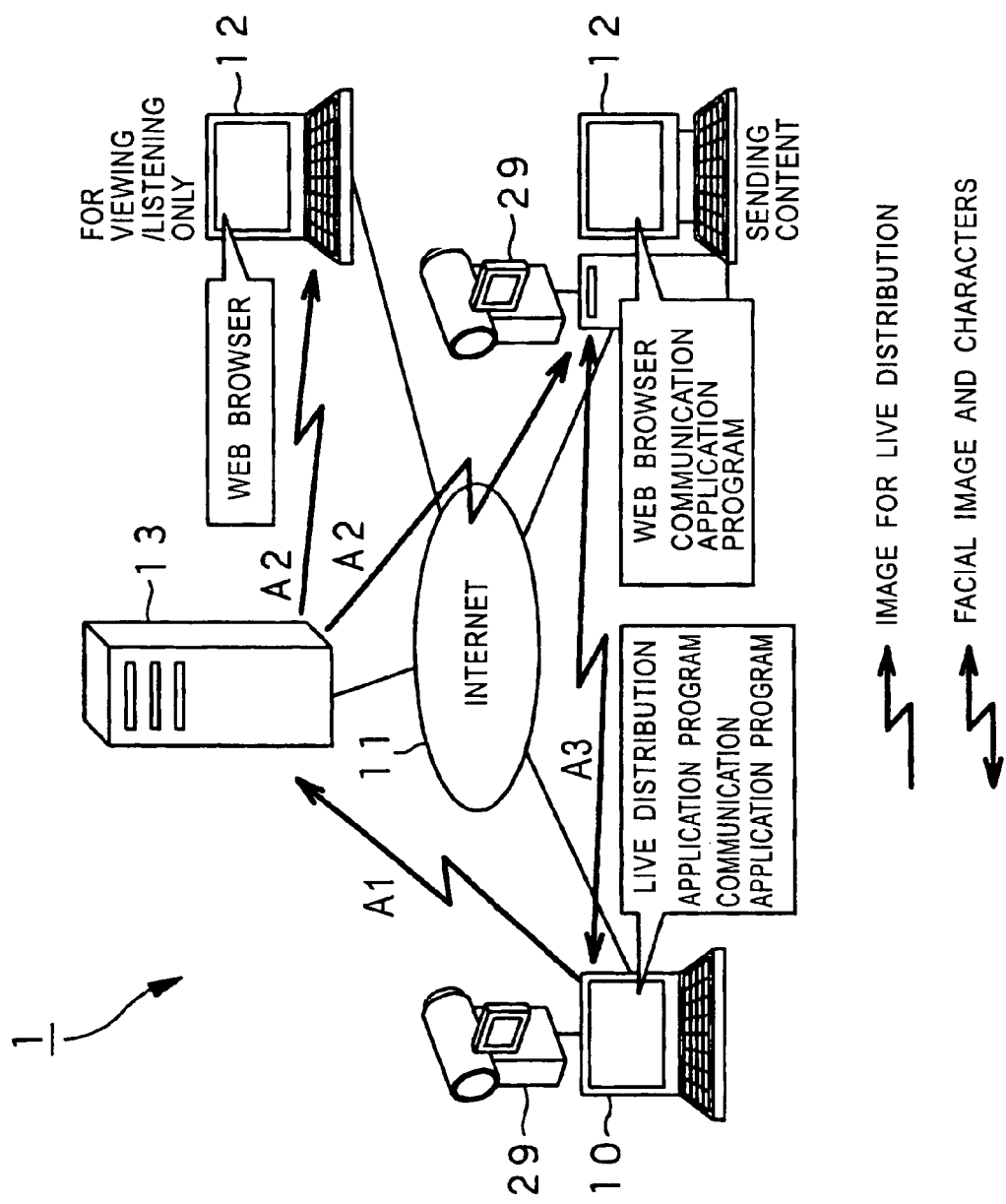
FIG. 4 is a schematic diagram showing the connection relationship between the user terminal and a client terminal in the content distribution system.

FIG. 4 shows a case in which the digital video camera (DV camera) 29 serving as an external unit, with respect to the user terminal 10, is connected to the user terminal 10.

In the content distribution system 1, as described above, when the user terminal 10 performs live distribution, content created by the live distribution application program executed on the user terminal 10 is sent from the user terminal 10 to the streaming distribution server 13 via the Internet 11, as indicated by the arrow A1 of FIG. 4. The streaming distribution server 13 distributes the content to the plurality of client terminals 12, as indicated by the arrows A2 of the drawing.

In addition to the live distribution application program described above, a communication application program for obtaining and using content sent from a client terminal is executed on the user terminal 10.

The communication application program is, similar to the live distribution application program, for example, recorded in the HDD 23 of the user terminal 10. By executing the communication application program by the CPU 20, the user terminal 10 can obtain and use content sent from a client terminal. The communication application program may be provided, for example, by a predetermined recording medium, such as a so-called compact disc, or a transmission medium, such as the Internet.

As will be described below, the communication application program operates in close cooperation with the above-described live distribution application program. The communication application program may be executed independently of the live distribution application program.

In the content distribution system 1, the client terminals 12 are largely classified into those serving as viewing/listening-only terminals for viewing/listening to content distributed from the streaming distribution server 13 and those capable of sending content to the user terminal 10 that performs live distribution.

The viewing/listening-only client terminal 12 only needs to be capable of executing an application program such as a Web browser for viewing/listening to distributed content.

The client terminal 12 capable of sending content has, as shown in FIG. 4, a DV camera 29 included therein or connected thereto, as in the user terminal 10. In addition to the application program for viewing/listening to distributed content (such as the Web browser), the client terminal 12 needs to be capable of executing at least a communication application program for sending content to the user terminal 10.

In the client terminal 12 capable of sending content, content such as video data or audio data captured by the DV camera 29 or text data input from an input unit of the client terminal 12 is, as indicated by the arrow A3 of FIG. 4, directly sent to the user terminal 10 via the Internet 11, instead of via the streaming distribution server 13.

In the content distribution system 1, direct sending of content from the client terminal 12 to the user terminal 10 is realized by the following method.

Specifically, the user terminal 10 sends content to be distributed live and sender specific information for specifying the user terminal 10 on the Internet 11 to the streaming distribution server 13. The streaming distribution server 13 sends the content and the sender specific information to each client terminal 12.

The sender specific information includes, for example, information that is allocated to the user terminal 10 and that is unique on the network, such as an IP address or a port number used by the communication application program on the user terminal 10 to receive content from the client terminal 12.

On the basis of the sender specific information distributed in conjunction with the content from the streaming distribution server 13, the client terminal 12 that sends content to the user terminal 10 specifies the user terminal 10 on the Internet 11 and establishes a connection (session) for sending/receiving the content to/from the user terminal 10 on the network. Instead of via the streaming distribution server 13, the client terminal 12 directly sends the content to the user terminal 10 by so called peer-to-peer communication. In other words, the client terminal 12 sends the content to the user terminal 10, not to a specific server on the network.

In the content distribution system 1, as described above, the client terminal 12 directly sends content to the user terminal 10 on the basis of the sender specific information, instead of via a specific server apparatus such as the streaming distribution server 13. This enables very smooth content exchange between the client terminal 12 and the user terminal 10 without taking into consideration a load on the server apparatus.

(5) Actual Content Exchange between Client Terminal and User Terminal

A more specific description will now be given of a case in which, as described above, the user terminal 10 obtains the content sent from the client terminal 12 and performs live distribution using the content.

When the user terminal 10 wants to use the content sent from the client terminal 12 while executing the above-described live distribution application program, the user terminal 10 selects a communication application program activation button 51a displayed in the guidance bar 51 of the main window 50 shown in FIG. 3.

Figure 5:
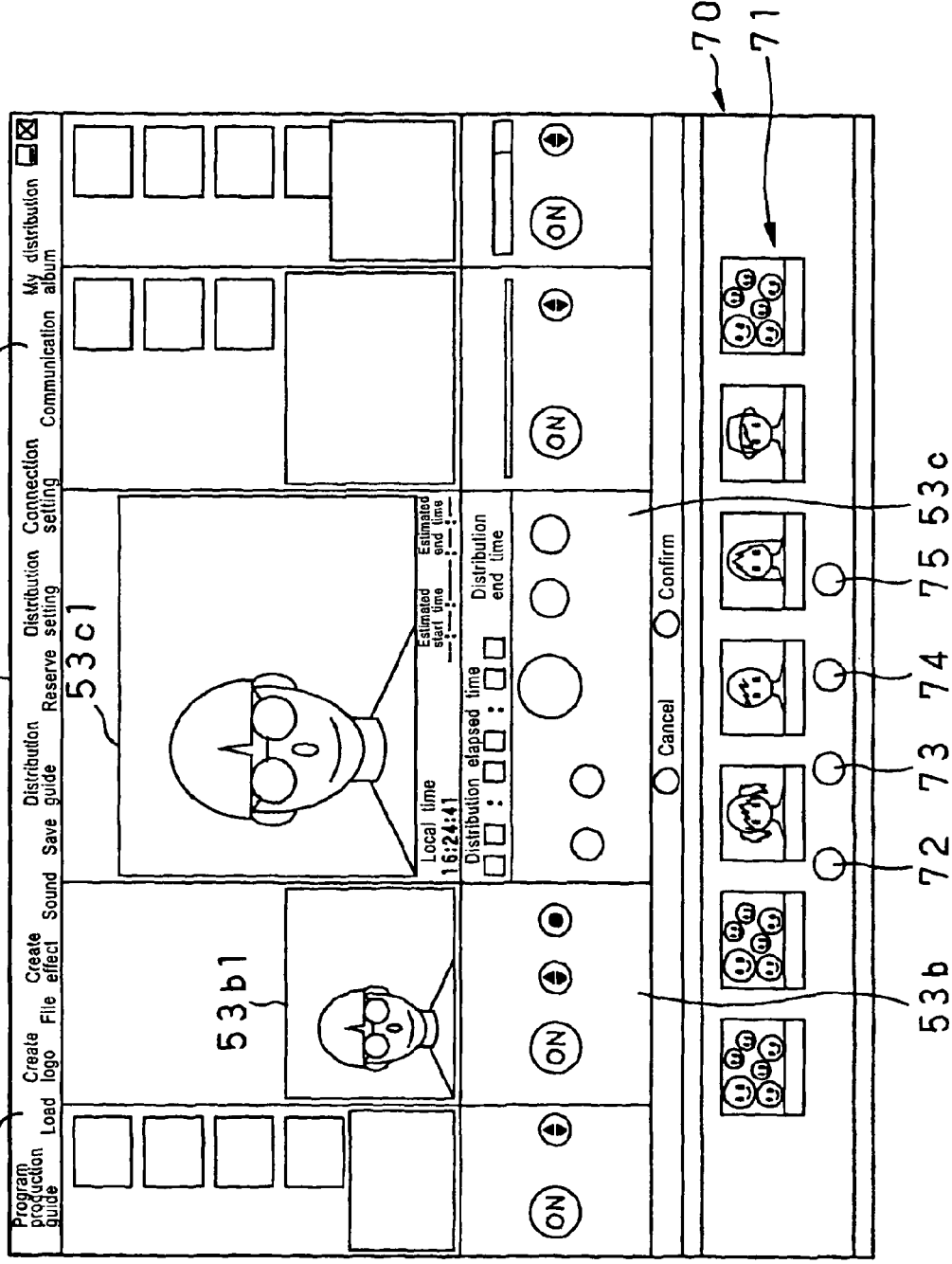
FIG. 5 is a schematic diagram showing a display screen in a state in which a communication application program is activated by the live distribution application program executed by the user terminal in the content distribution system.

In response to this, in the user terminal 10, the communication application program that operates in cooperation with the live distribution application program is activated. As shown in FIG. 5, a communication window 70 created by the communication application program is displayed at the bottom of the main window 50 of the live distribution application program.

The communication application program activation button 51a displayed in the guidance bar 51 of the main window 50 is selectable only when the content is being sent from the client terminal 12. When no content is being sent from the client terminal 12, the communication application program activation button 51a may be displayed as being unselectable.

As shown in FIG. 5, preview areas 71 for displaying images that have been captured by the DV camera 29 of each client terminal 12 and that have been sent to the user terminal 10 are arranged in the communication window 70. Each of the images displayed in the preview areas 71 is an image that has been captured by the DV camera 29 of the client terminal 12 and that has been sent to the user terminal 10. Each of the images may be a moving image or a still image.

The images displayed in the preview areas 71 include, for example, images of the faces of the operators of the client terminals 12, which are captured by the corresponding DV cameras 29. Each of the client terminals 12 is not only allowed to send a video image captured by the DV camera 29 to the user terminal 10, but also allowed to send, for example, video data that has been captured by the DC camera 29 and that has been recorded, image data created by various image creation application programs, or image data prepared in advance in the communication application program executed by the client terminal 12, which will be described below.

In the communication window 70, an insertion start button 72 for selecting insertion of each of the images displayed in the preview areas 71 (images sent from the client terminals 12) into video image to be distributed live, an insertion stop button 73 for stopping the insertion of the image sent from the client terminal 12 into the video image to be distributed live, a help reference button 74 for referring to help information concerning the communication application program, and a termination button 75 for terminating the communication application program are disposed at the bottom of the preview areas 71.

In the state shown in FIG. 5, an image being captured by the DV camera 29 of the user terminal 10 is displayed in the preview area 53b1 of the camera input panel window 53b of the main window 50 of the live distribution application program. The image is selected to be distributed live, and hence the image is also displayed in the preview area 53c1 of the main monitor panel window 53c. In the state shown in FIG. 5, the video image displayed in the preview area 53c1 is sent from the user terminal 10 to the streaming distribution server 13 and distributed live.

The video image displayed in the preview area 53c1 includes, for example, the face of the operator of the user terminal 10, that is, the face of the sender of a program to be distributed live, which is captured by the DV camera 29 of the user terminal 10.

Figure 6:
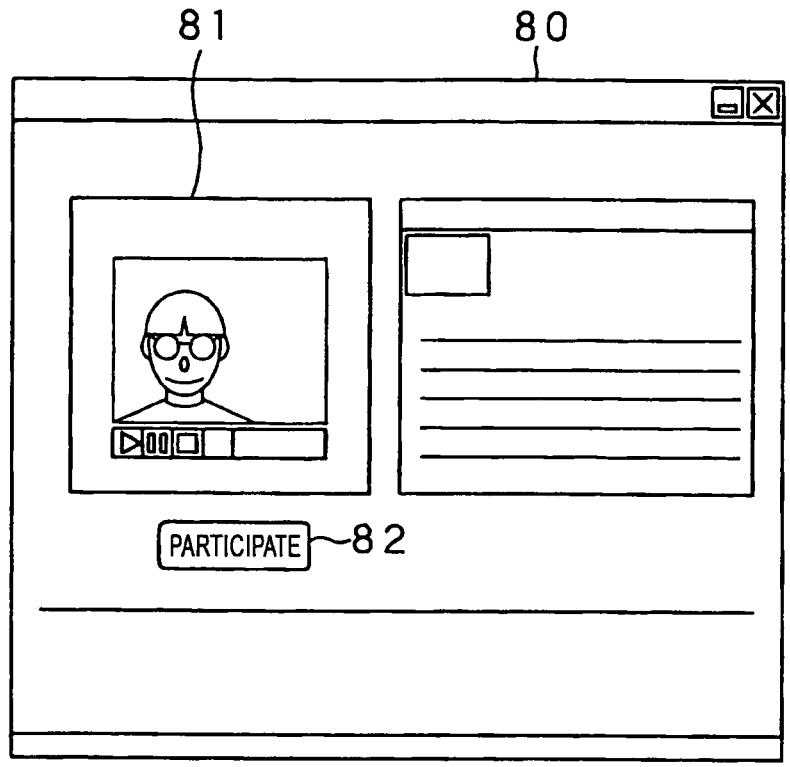
FIG. 6 is a schematic diagram showing an example of a display screen of the client terminal that views/listens to content distributed by the content distribution system.

In the content distribution system 1, a Web browser is activated on each of the client terminals 12. As shown in FIG. 6, a window 80 created by the Web browser is displayed on the display screen. The Web browser on the client terminal 12 receives content distributed from the streaming distribution server 13. The Web browser displays predetermined details in the window 80 on the basis of an HTML (Hyper Text Mark-up Language) file obtained from the streaming distribution server 13.

The Web browser is provided with a predetermined plug-in program for displaying/playing content including a moving image, a still image, and audio data distributed from the streaming distribution server 13. A content display area 81 created by the plug-in program is displayed at a predetermined position in the window 80 created by the Web browser.

Since the distributed content is displayed in the window 80 of the Web browser, there is no need to prepare a dedicated application program for viewing/listening to a program that is distributed live. Since the content is displayed in the window 80 of the Web browser, information related to the distributed content or the like is easily displayed. Also, various pieces of information can be supplied from the streaming distribution server 13 to the client terminal 12. Diversified and flexible content is thus distributed.

Since the content is displayed in the window 80 of the Web browser, reliable and satisfactory content viewing/listening is made possible, which is free from the environment dependent on the operation system running on the client terminal 12 or the like.

The content sent from the user terminal 10 is displayed/played in the content display area 81. Consequently, the content that has been sent from the user terminal 10, that is, the content that has been displayed in the preview area 53c1 of the main monitor panel window 53c of the user terminal 10 and that has been distributed live, is displayed in the content display area 81 of the client terminal 12.

In addition to the content display area 81 created by the above-described plug-in program, the window 80 of the Web browser may display the details of the program displayed in the content display area 81 or sender-related information in the form of text or an image. The client terminal 12 can obtain such program details, sender-related information, and the like in the form of an HTML file from the streaming distribution server 13.

In the window 80 of the Web browser, a participate button 82 for enabling the operator of the client terminal 12 to participate in the program being distributed by the streaming distribution server 13 is displayed below the content display area 81. When the participate button 82 is selected, the communication application program, in addition to the Web browser, is activated on the client terminal 12.

The communication application program that is activated on the client terminal 12 is capable of directly exchanging various pieces of data with the communication application program that is activated on the user terminal 10. The communication application program activated on the client terminal 12 may be a separate program corresponding to the communication application program activated on the user terminal 10 or may be a program equivalent to the communication application program activated on the user terminal 10. When the communication application program to be executed is shared by the client terminal 12 and the user terminal 10, the activation mode of the communication application program can be appropriately changed by specifying by the user or by automatically determining the status.

Figure 7:
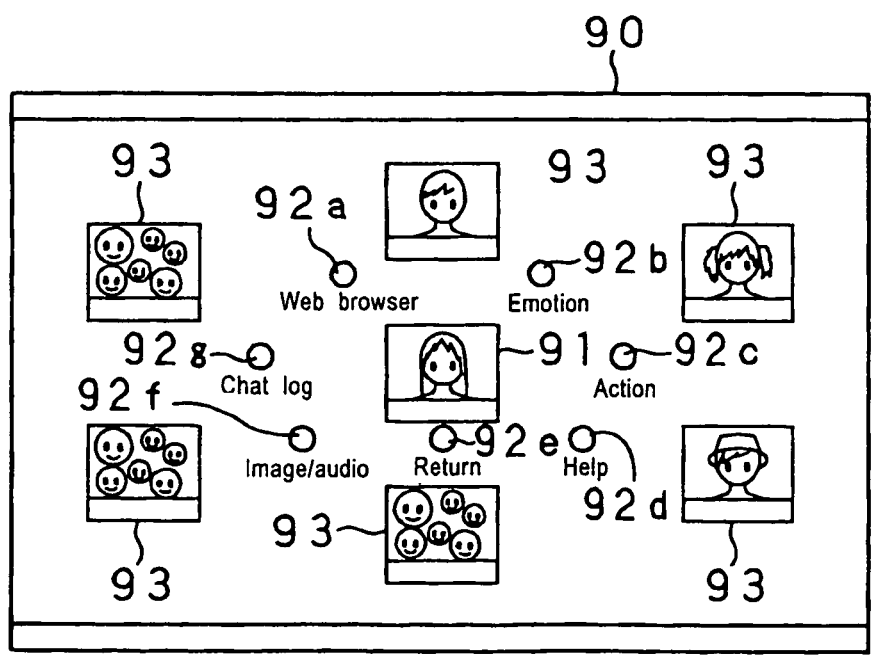
FIG. 7 is a schematic diagram showing an example of a communication window created by the communication application program executed by the client terminal in the content distribution system.

When the communication application program is activated on the client terminal 12, as shown in FIG. 7, a communication window 90 created by the communication application program is displayed on the display screen of the client terminal 12. The communication window 90 and the window 80 of the Web browser may be displayed at the same time on the display screen or may be displayed one at a time.

As shown in FIG. 7, the communication window 90 includes a self-portrait display area 91 that displays an image captured by the DV camera 29 included in or connected to the client terminal 12. Around the self-portrait display area 91, a plurality of buttons 92a to 92g for selecting various instructions and operations is disposed. In the outer periphery of the plurality of buttons 92a to 92g, a plurality of image display areas 93 that display images sent from other client terminals 12 is disposed.

The self-portrait display area 91 is an area that displays an image captured by the DV camera 29 included in or connected to the client terminal 12 that executes the communication application program. In general, the self-portrait display area 91 displays a captured image of the face of the operator of the client terminal 12.

The buttons 92a to 92g have the following functions.

The Web browser activation button 92a is a button for activating a Web browser. When the Web browser activation button 92a is selected, an external Web browser program is invoked and activated, or a Web browser included in the communication application program is activated.

The emotion button 92b is a button for adding effects representing various emotions to the image displayed in the self-portrait display area 91. When the emotion button 92b is selected, various emotions, e.g., "crying", "laughing", and "getting upset", are represented by adding effects including animation and sound effects to the image displayed in the self-portrait display area 91.

The action button 92c is a button for adding effects representing various actions to one of the images that are displayed in the image display areas 93 and that are sent from the other client terminals 12. When the action button 92c is selected, various actions, e.g., "hitting", "patting", and "pinching", are represented by adding effects including animation and sound effects to one of the images displayed in the image display areas 93.

The help button 92d is a button for referring to help information concerning the communication application program. When the help button 92d is selected, a window that displays the help information opens. The user can read various operational descriptions and confirm setting methods and the like.

The return button 92e is a button for terminating the communication application program or going back one step to the previous menu displaying step. When the return button 92e is selected, the communication application program is terminated, or the display goes back one step to the previous menu displaying step, that is, goes back one step to the previous displaying step in the menu display, which is a hierarchical structure.

The image/audio button 92f is a button for selecting the image to be displayed in the self-portrait display area 91. When the image/audio button 92f is selected, the image to be displayed in the self-portrait display area 91 is again selected from among facial images registered in advance in the communication application program, or a moving image captured by the DV camera 29 connected to the client terminal 12 is selected to serve as a self portrait to be displayed in the self-portrait display area 91. When the moving image captured by the DV camera 29 is selected to serve as the self portrait, the output level of sound input from the DV camera 29 can be set.

The chat log button 92g is a button for displaying log data in a case in which a so-called chat function is used. As will be described below, the chat function involves exchange of text data input from the communication application program with the user terminal 10 or the other client terminals 12.

On the client terminal 12, when the participate button 82 displayed in the window 80 created by the Web browser, which is shown in FIG. 6, is selected to activate the communication application program and to display the communication window 90, the communication application program directly exchanges various pieces of data with the user terminal 10 on the basis of the sender specific information sent from the streaming distribution server 13 and sends a moving image or still image displayed in the self-portrait display area 91 to the user terminal 10.

Accordingly, as shown in FIG. 5, moving images or still images sent from the client terminals 12 are displayed in the preview areas 71 of the communication window 70 displayed on the display unit 24 of the user terminal 10.

In the preview areas 71, as shown in FIG. 5, a list of pieces of content provided by the client terminals 12 is displayed. The user operating the user terminal 10 thus looks at the display and easily determines which of the participants can participate in the program to be distributed live. The user can intuitively select the participant(s) whom are allowed to participate in the program.

Figure 8:
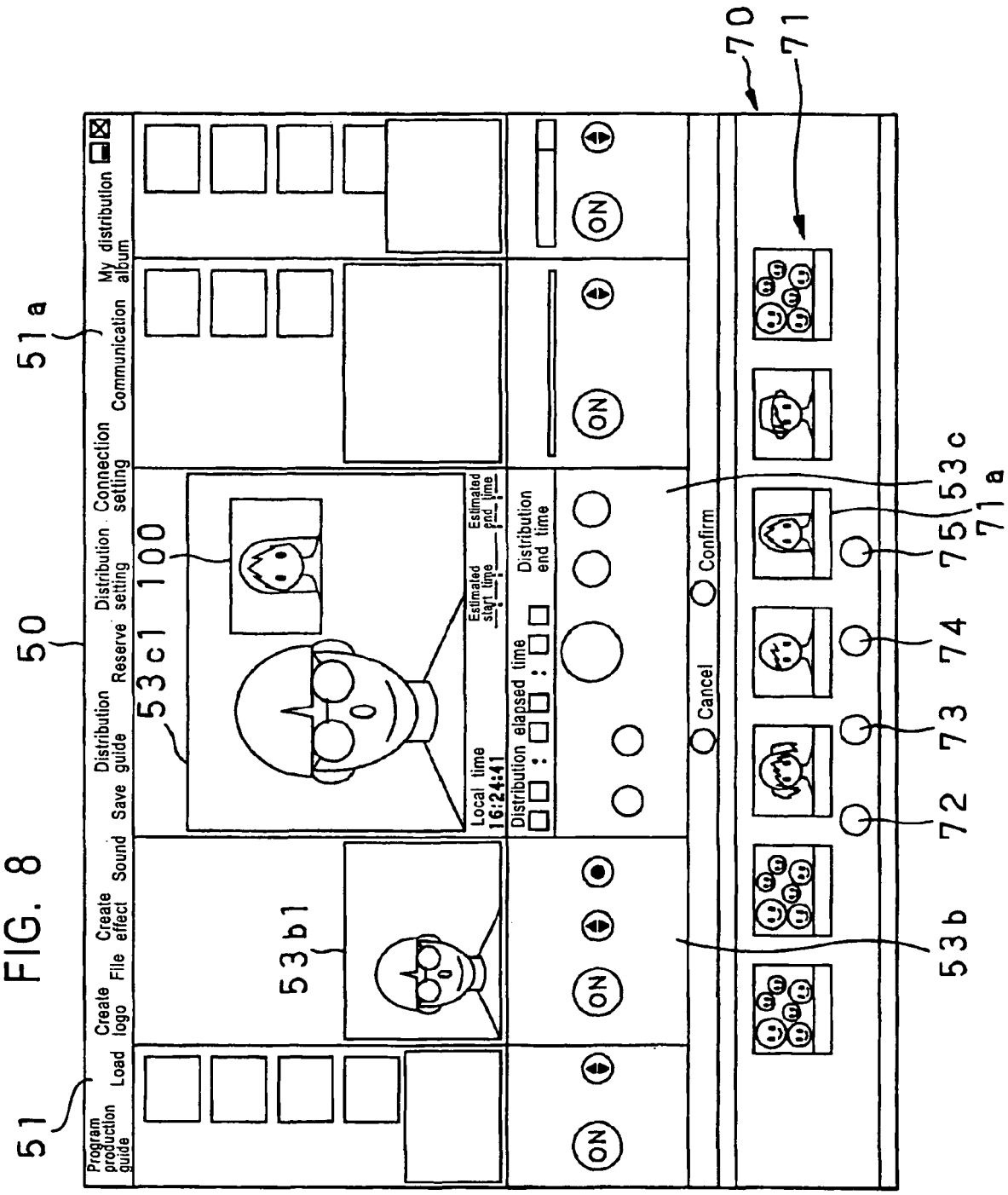
FIG. 8 is a schematic diagram showing an example of the display screen in a case in which content sent from the client terminal is inserted by the user terminal in the content distribution system.

In the user terminal 10, when the insertion start button 72 of the communication window 70 is selected to select one of facial images displayed side by side in the preview areas 71, as shown in FIG. 8, the selected facial image is inserted in a predetermined position of the image displayed in the preview area 53c1 of the main monitor panel window 53c.

In FIG. 8, the image displayed in the self-portrait display area 91 of the communication window 90 of the client terminal 12, which is shown in FIG. 7, is reflected as a facial image 71a in one of the preview areas 71 of the communication window 70. By selecting the facial image 71a, the facial image 71a is inserted as a facial image 100 in the preview area 53c1 of the main monitor panel window 53c.

Figure 9:
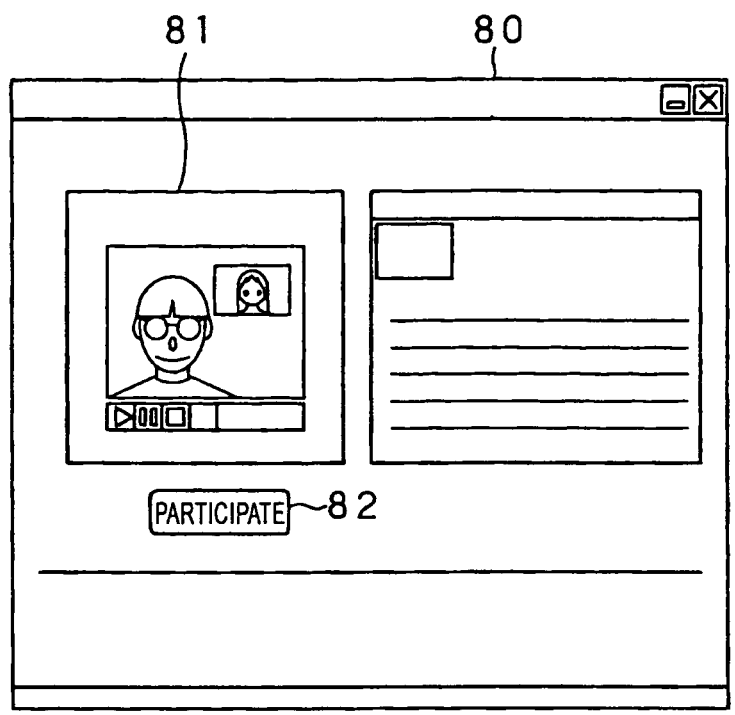
FIG. 9 is a schematic diagram showing an example of the display screen of the client terminal that views/listens to content containing the content that has been inserted by the user terminal in the content distribution system.

When the facial image 100 sent from the client terminal 12 is inserted by the user terminal 10 into the original distributed image, the moving image containing the facial image 100 that has been inserted therein is sent to the streaming distribution server 13, and the moving image is distributed live to the client terminals 12. In other words, in each of the client terminals 12, as shown in FIG. 9, a moving image corresponding to the image displayed in the preview area 53c1 of the main monitor panel window 53c shown in FIG. 8 is displayed in the content display area 81 of the window 80 of the Web browser for browsing the distributed program.

Figure 10:
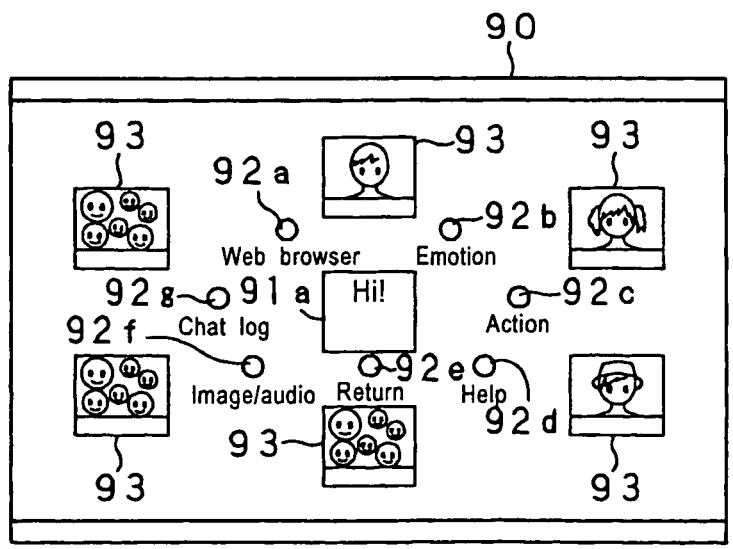
FIG. 10 is a schematic diagram showing an example of the display screen in a state in which text data is input by the communication application program running on the client terminal in the content distribution system.

In the communication application program executed by the client terminal 12, for example, when a mouse cursor is moved to the self-portrait display area 91, as shown in FIG. 10, a text entering box 91a is displayed at a position corresponding to the self-portrait display area 91.

A description will now be given of a case in which the client terminal 12, whose facial image has been selected by the user terminal 10 to be inserted into the moving image to be distributed live, uses an input unit such as a keyboard provided therewith to enter text data, such as "Hi!", in the text entering box 91a.

In this case, the communication application program executed by the client terminal 12 specifies the user terminal 10 on the Internet 11 on the basis of the sender specific information distributed by the streaming distribution server 13 and directly sends the text data entered in the text entering box 91a to the user terminal 10.

Figure 11:
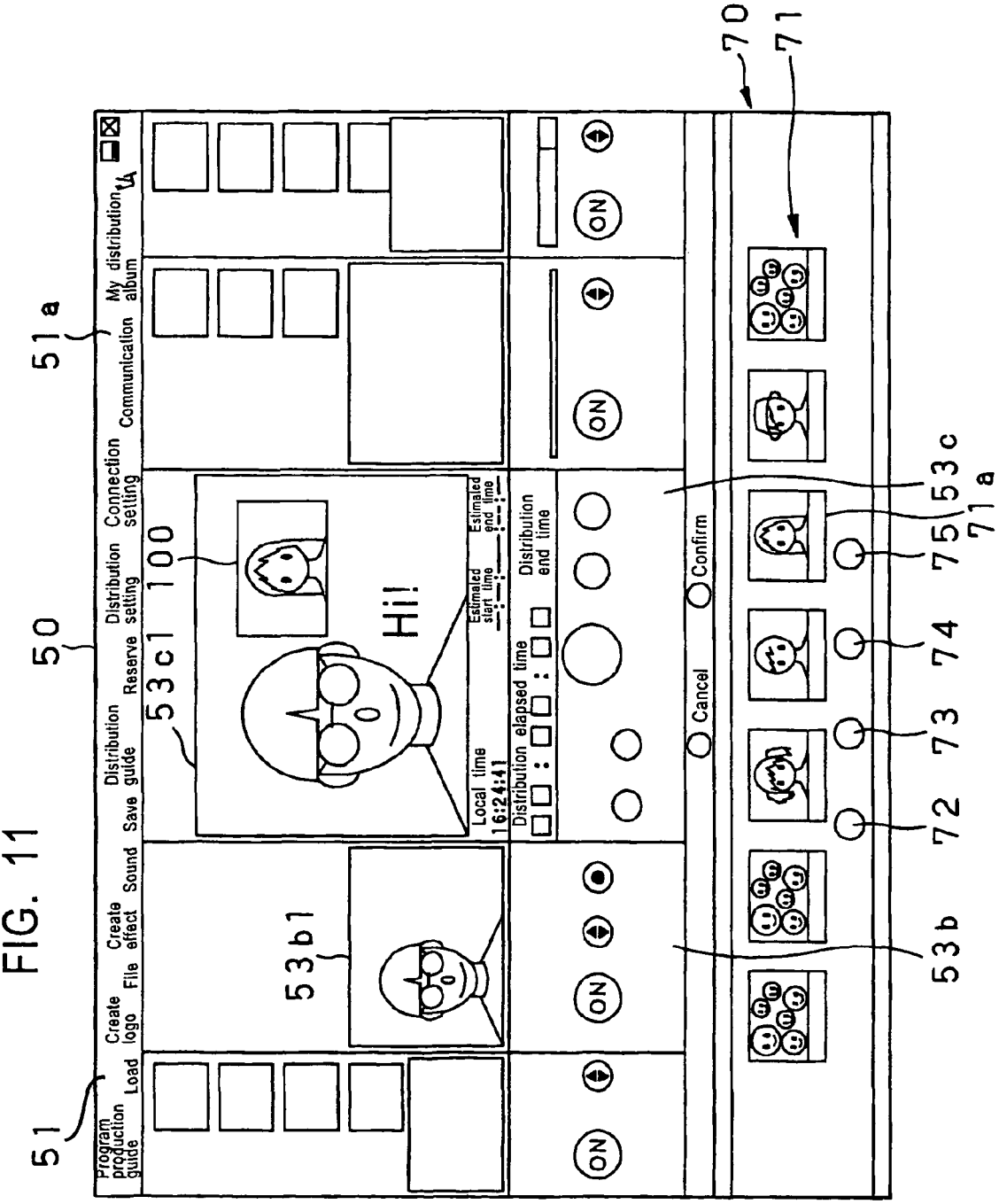
FIG. 11 is a schematic diagram showing an example of the display screen in a case in which the text data input from the client terminal is obtained and used by the user terminal in the content distribution system.

In response to this, the user terminal 10 displays, as shown in FIG. 11, a combination of the image in the preview area 53c1 of the main monitor panel window 53c and the text data "Hi!" that has been sent form the client terminal 12, as described above, and that has been inserted in the image.

The user terminal 10 sends the image displayed in the preview area 53c1 of the main monitor panel window 53c, that is, the moving image containing the facial image 100 that has been sent from the client terminal 12 and the text data "Hi!", both of which have been inserted in the moving image, to the streaming distribution server 13. The moving image is distributed live by the streaming distribution server 13 to each of the client terminals 12.

Figure 12:
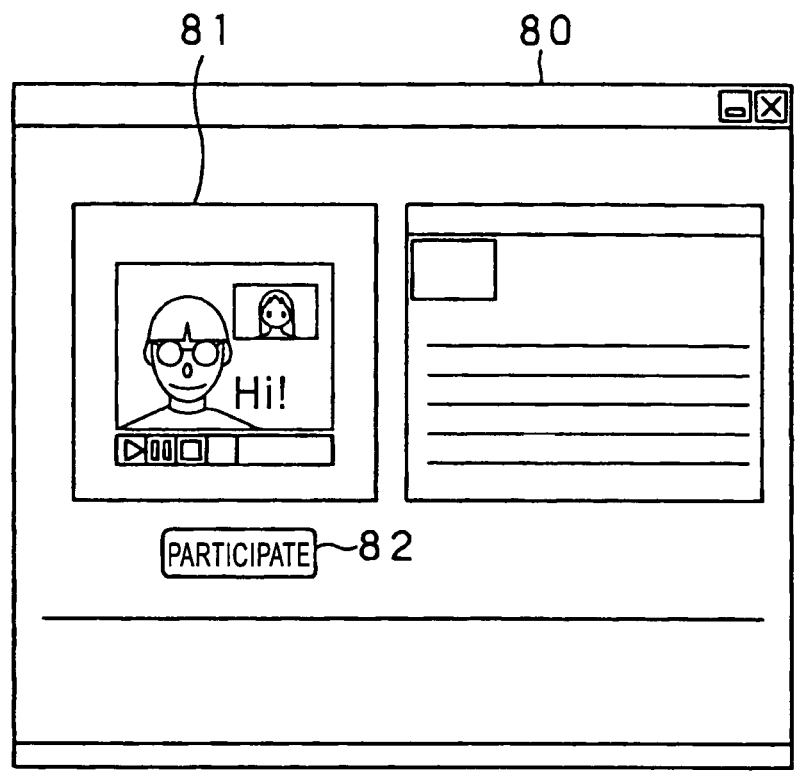
FIG. 12 is a schematic diagram showing an example of the display screen in a case in which the client terminal views/listens to content containing the text data that has been inserted in the content distribution system.

Accordingly, as shown in FIG. 12, the moving image containing the facial image 100 and the text data "Hi!", both of which have been inserted in the moving image, is displayed in the content display area 81 of the window 80 of the Web browser of each of the client terminals 12.

In the content distribution system 1 arranged as described above, the client terminal 12 serving as the viewer/listener of the program being distributed live directly sends content such as an image or text on the basis of the sender specific information to the user terminal 10 serving as the sender. The user terminal 10 freely uses the content sent from the client terminal 12 and reflects the content in the program being distributed live.

According to the content distribution system 1, a so-called audience participation program is realized using the Internet in a very simple, user-friendly manner. For example, viewers/listeners are asked many questions or asked to do a quiz, and their answers are displayed using text. Accordingly, a diversified and flexible program is easily distributed live. For example, an image captured by or text entered by a viewer/listener at a remote place, away from the user terminal 10 serving as the sender, is freely combined with a moving image to be live-distributed by the user terminal 10. Accordingly, such a program that is distributed in a manner as if a plurality of locations is connected by relay technology is realized using the Internet.

(6) Processing by Communication Application Program

With reference to the flowcharts, a series of processes executed by the above-described communication application program on the user terminal 10 will be described in a sequence.

The communication application program may be, for example, activated to enter different states between the case of being activated by the live distribution application program on the user terminal 10 and the case of being activated by the Web browser on the client terminal 12. In the two cases, different functions may be executable. A description will now be given of, as shown in FIGS. 5, 8, and 11, a series of processes by the communication application program in the case of being activated by the live distribution application program. The series of processes described below is implemented by performing, by the CPU 20 of the user terminal 10, various arithmetic operations and by controlling the operation of each component in accordance with the flow of each process written in the communication application program.

Figure 13:
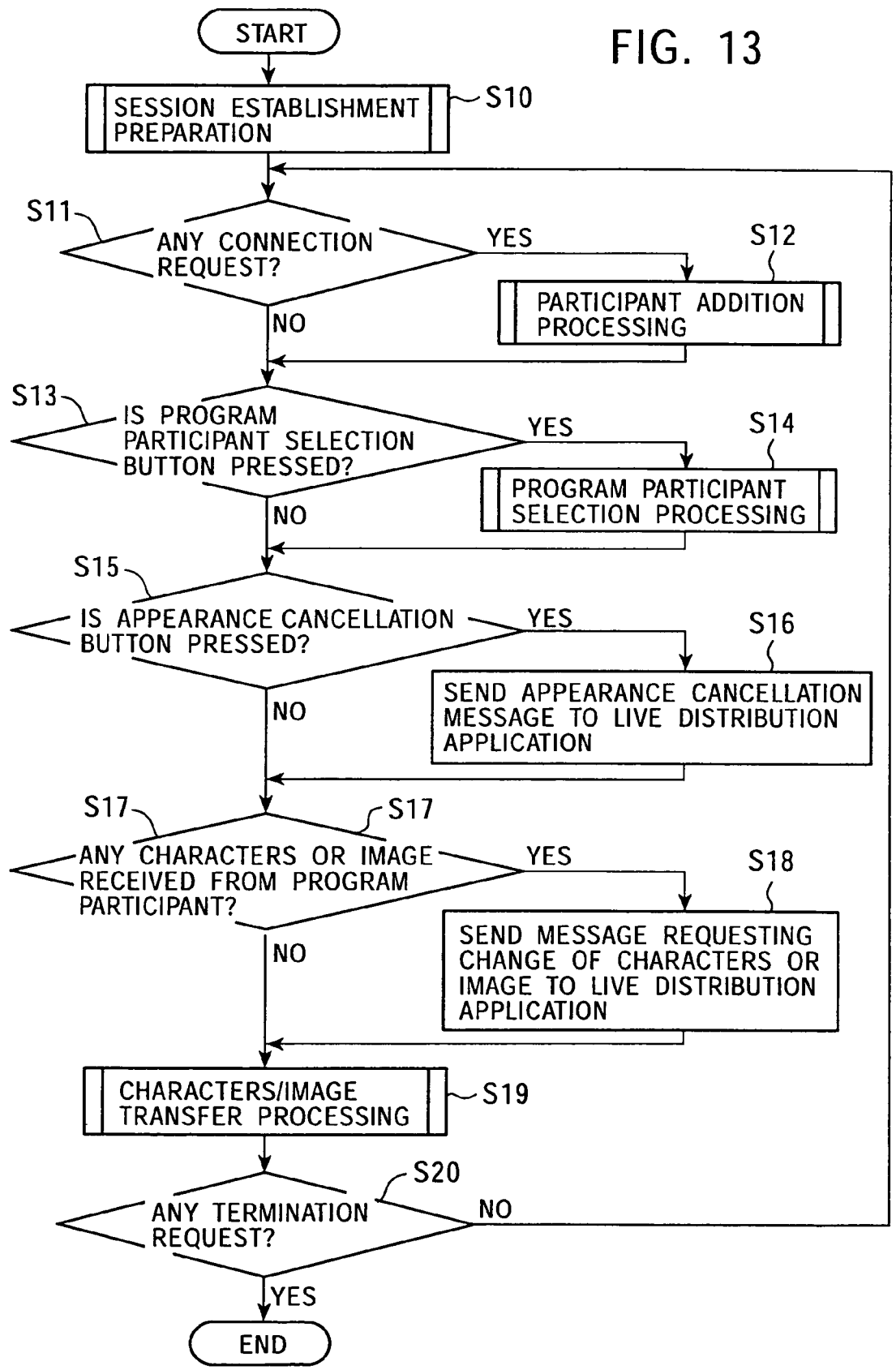
FIG. 13 is a flowchart showing an example of a process executed by the communication application program executed by the user terminal in the content distribution system.

When the communication application program is activated by the live distribution application program, as shown in step S10 of the flowchart shown in FIG. 13, the communication application program prepares for establishment of a session. In step S10, the communication application program exchanges various pieces of data with the live distribution application program to prepare to obtain content such as a facial image sent from the client terminal 12. The processing in step S10 will be described in detail later.

In step S11, it is determined whether or not a connection request has been received from the communication application program activated on the client terminal 12. In other words, in step S11, it is determined whether or not content such as the facial image 100 has been sent from the client terminal 12. When it is determined that the connection request has been received, the process proceeds to step S12. When no connection request has been received, the process proceeds to step S13.

In step S12, the content such as the facial image 100 sent from the client terminal 12 is added to one preview area 71 of the communication window 70. It is now prepared for a new participant to participate in a program to be sent from the user terminal 10. The processing in step S12 will be described in detail later.

In step S13, it is determined whether or not the insertion start button 72 disposed in the communication window 70 is selected to enable a new participant to appear on the program. When it is determined that the insertion start button 72 is selected, the process proceeds to step S14. When the insertion start button 72 is not selected, the process proceeds to step S15.

In step S14, it is determined which of the pieces of content arranged in the preview areas 71 of the communication window 70 is selected as a program participant to be inserted into content to be distributed live. The processing in step S14 will be described in detail later.

In step S15, it is determined whether or not the insertion stop button 73 disposed in the communication window 70 is selected to cancel the insertion of the content that has been inserted in step S14. In other words, when the program participant from the client terminal 12 has been inserted in the program to be distributed live, it is determined whether or not to cancel the appearance of the participant. When it is determined that the insertion stop button 73 is selected, the process proceeds to step S16. When the insertion stop button 73 is not selected, the process proceeds to step S17.

In step S16, a message is sent requesting the live distribution application program to cancel the appearance of the participant who has been inserted into the program to be distributed live. That is, the live distribution application program is requested to cancel the insertion of the content from the client terminal 12. Accordingly, the live distribution application program cancels the insertion of the content from the client terminal 12 into the program to be sent from the user terminal 10.

In step S17, it is determined whether or not new content such as image data or text data has been sent from the client terminal 12 that is the sending source of the content that has been inserted in the program to be distributed live and whether or not such new content has been received. When it is determined that new content has been received from the client terminal 12 that currently appears on the program, the process proceeds to step S18. When no new content has been received, the process proceeds to step S19.

In step S18, the new content such as image data or text data received from the client terminal 12 that is currently on the program is sent to the live distribution application program. Accordingly, the live distribution application program inserts the new content into the program to be distributed live and displays the program including the new content.

In step S19, the content such as text data or image data obtained from the client terminal 12 that is currently on the program is sent and transferred to the live distribution application program, thus updating the content to be inserted into the program to be distributed live.

In step S20, it is determined whether or not a request to terminate the communication application program has been issued by the user, that is, the operator of the user terminal 10.

Such a request is, for example, issued by selecting the termination button disposed in the communication window 70 or inputting a request to terminate the communication application program by the operation unit 26 including, for example, a keyboard or the like. When it is determined that the termination request has been issued, the communication application program is terminated, and the communication window 70 is closed. The display screen enters the state shown in FIG. 3. When no termination request has been issued, the process returns to step S11, and the above-described series of steps is continuously performed.

Figure 14:
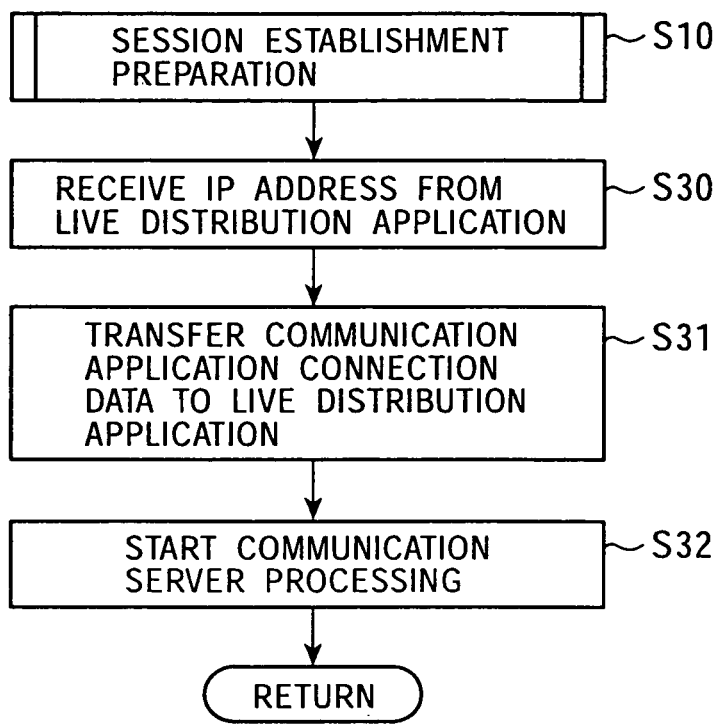
FIG. 14 is a flowchart showing an example of a process of preparing for session establishment by the communication application program in the content distribution system.

With reference to FIG. 14, the session establishment preparation in step S10 described above will now be described.

When the processing in step S10 starts, as shown in step S30 of FIG. 14, the user terminal 10 obtains its own IP address from the live distribution application program. The IP address is information for specifying the user terminal 10 on the Internet 11. Generally, the IP address is represented by four sets of numerals, such as "134.55.22.33".

In step S31, connection data necessary for the client terminal 12 to connect to the communication application program executed on the user terminal 10, that is, sender specific information, is generated. The sender specific information is transferred to the live distribution application program.

Figure 15:
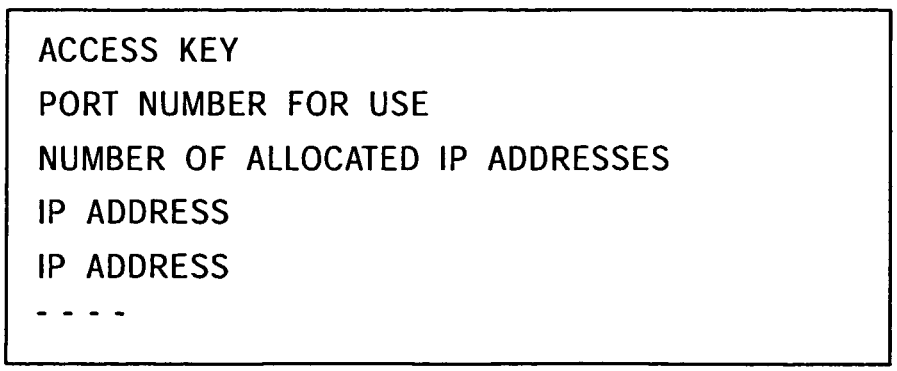
FIG. 15 is a schematic diagram showing an example of sender specific information (connection data) used in the communication application program in the content distribution system.

The sender specific information includes, for example, as shown in FIG. 15, an access key for authentication or the like when an access is attempted to the communication application program executed on the user terminal 10, a port number of the network interface 28 of the user terminal 10 used by the communication application program, the number of IP addresses used to connect to the communication application program, a series of IP addresses used to connect to the communication application program, and the like.

In step S32, the communication application program starts the server processing for securing a connection with the client terminal 12. Accordingly, the user terminal 10 can obtain content sent from the client terminal 12, or the user terminal 10 and the client terminal 12 can exchange various pieces of data with each other.

After the series of steps in the session establishment preparation in step S10 has been performed as described above, the process returns to step S11.

Figure 16:
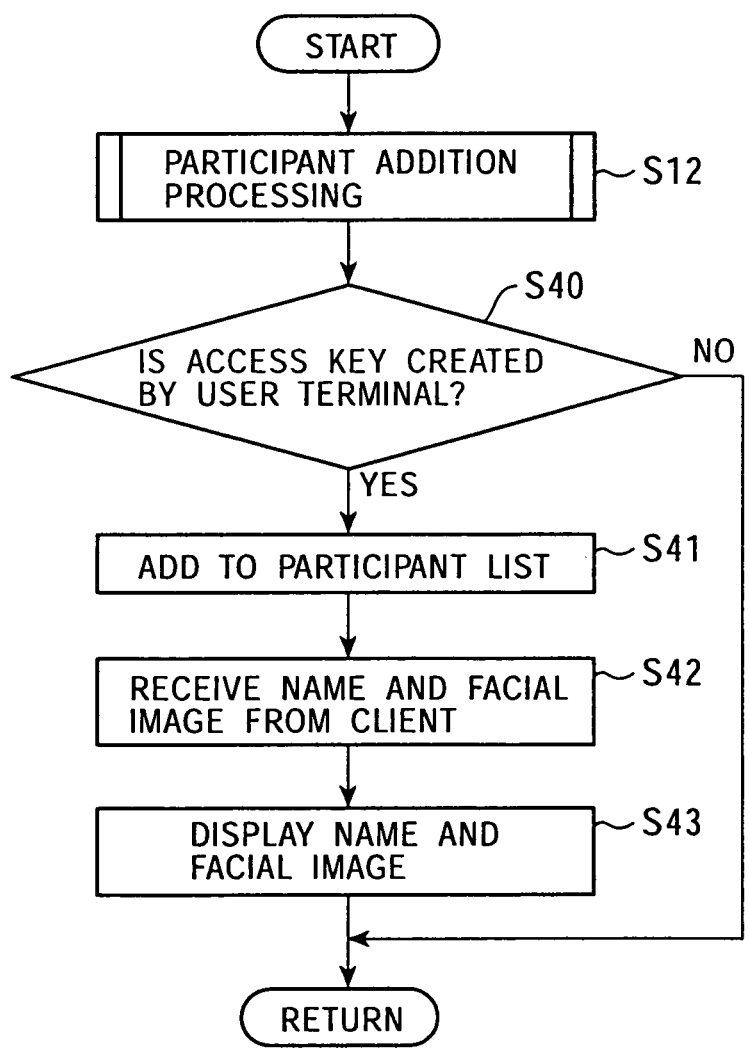
FIG. 16 is a flowchart showing an example of a process of adding a participant by the communication application program in the content distribution system.

With reference to FIG. 16, the participant addition processing in step S12 described above will now be described.

When the participant addition processing in step S12 starts, in step S40 of FIG. 16, an access key included in data sent from the client terminal 12 is compared with the access key included in the sender specific information shown in FIG. 15 to determine whether or not the former access key matches the access key created by the communication application program. That is, it is determined whether or not content sent from the client terminal 12 is sent to be used by the communication application program. When it is determined that the two access keys match each other, the process proceeds to step S41. When the two access keys do not match each other, the participant addition processing in step S12 is cancelled, and the process proceeds to step S13.

In step S41, the content sent from the client terminal 12 is added and registered in a participant list. The participant list corresponds to a list of pieces of content such as facial images displayed in the preview areas 71 of the communication window 70.

In step S42, the content such as the facial image 100 and a registration name is obtained from the client terminal 12. In step S43, the facial image 100 and the registration name obtained in step S42 are displayed in the preview area 71. In other words, on the basis of the participant list, the preview area 71 of the communication window 70 displays the details of the content registered in the participant list.

After the series of steps in the participant addition processing in step S12 has been performed as described above, the process returns to step S13.

Figure 17:
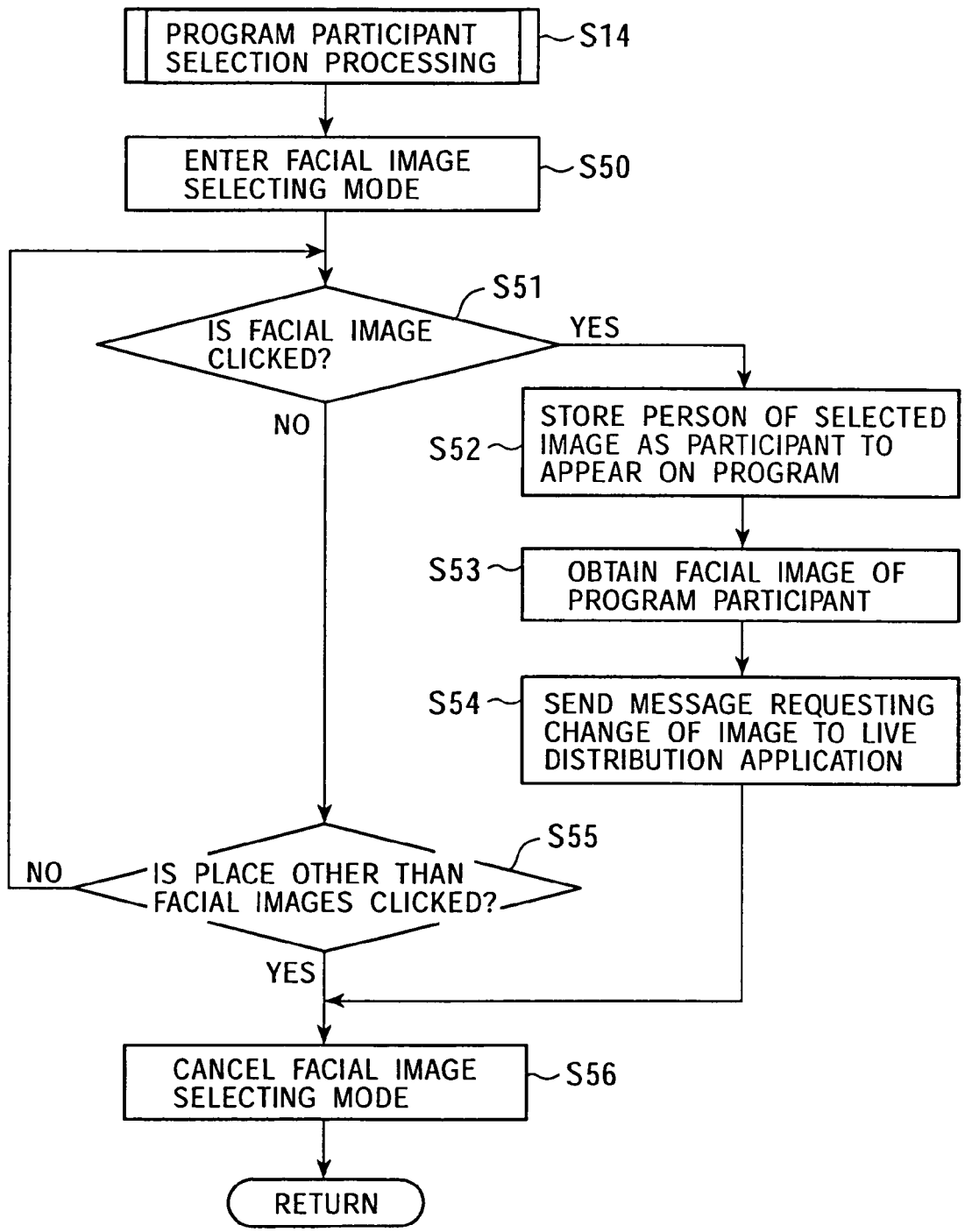
FIG. 17 is a flowchart showing an example of a process of selecting a participant to appear on a program by the communication application program in the content distribution system.

With reference to FIG. 17, the participant selection processing in step S14 described above will now be described.

When the participant selection processing in step S14 starts, as shown in step S50 of FIG. 17, the process enters a mode of selecting one piece of content from among pieces of content such as a plurality of facial images disposed in the preview areas 71 of the communication window 70.

In step S51, it is determined which of the pieces of content such as a plurality of facial images disposed in the preview areas 71 has been selected. One piece of content is selected by, for example, clicking on one of the facial images using a mouse or the like included in the operation unit 26 of the user terminal 10. When it is determined that one piece of content has been selected, the process proceeds to step S52. When no content has been selected, the process proceeds to step S55.

In step S52, the piece of content selected in step S51 is stored as a participant to be inserted in the program to be distributed live and to appear on the program. In step S53, the details of the piece of content are obtained from the client terminal 12 that is the sending source of the piece of content. In step S54, information concerning the piece of content obtained in step S53 is transferred to the live distribution application program. Accordingly, the live distribution application program inserts the content that has been sent from the client terminal 12 into the program to be distributed live. After step S54 is completed, the process proceeds to step S56.

In step S55, it is determined whether or not a place other than the pieces of content such as the facial images disposed in the preview areas 71 is clicked using, for example, the mouse or the like included in the operation unit 26. When it is determined that a place other than the pieces of content has been clicked, the process proceeds to step S56. When such a place is not clicked, the process returns to step S51, and the processing from step S51 onward is repeated. In other words, it is determined in step S55 whether or not to cancel the mode of selecting a piece of content such as a facial image.

In step S56, the mode of selecting a piece of content such as a facial image is cancelled, and the process returns to step S15.

Figure 18:
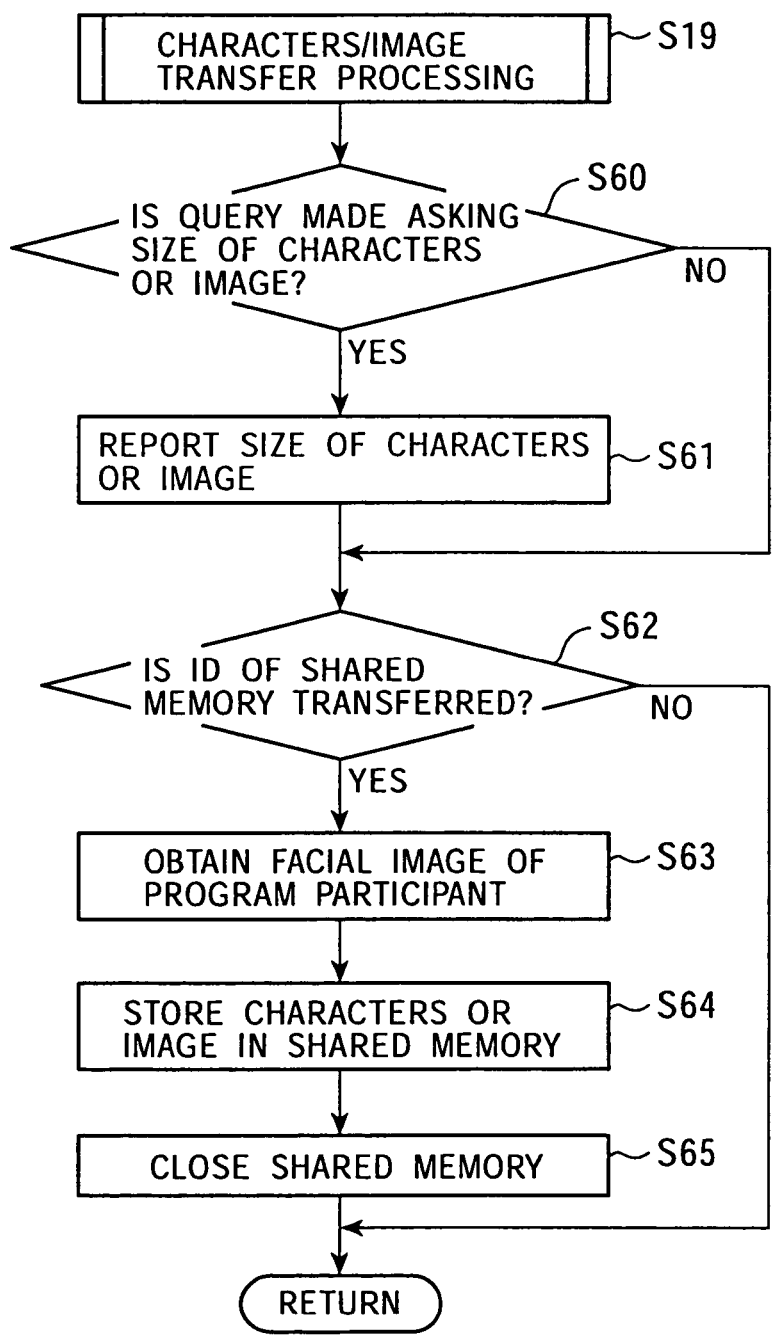
FIG. 18 is a flowchart showing an example of a process of transferring characters or an image from the communication application program to the live distribution application program in the content distribution system.

With reference to FIG. 18, the content transfer processing to the live distribution application program in step S19 described above will now be described.

When the content transfer processing to the live distribution application program starts in step S19, as shown in step S60 of FIG. 18, it is determined whether or not a query has been made by the live distribution application program asking the size of the content such as text data or image data to be inserted. The asked size is represented by, for example, the numbers of horizontal and vertical pixels of the content to be inserted. When it is determined that a query has been made, the process proceeds to step S61. When no query has been made, the process proceeds to step S62.

In step S61, the size of the content to be inserted, which has been asked by the live distribution application program, is computed, and the computed size is reported to the live distribution application program. Accordingly, the live distribution application program determines the size of the content to be inserted into the program to be distributed live before actually receiving the content, thereby performing various types of pre-processing.

In step S62, it is determined by the live distribution application program whether or not information concerning a memory to be shared by the live distribution application program and the communication application program (shared memory) has been exchanged. The information concerning the shared memory includes, for example, a start address in the RAM 21 included in the user terminal 10, the number of blocks allocated as the shared memory in the RAM 21, and the like. When it is determined that the information concerning the shared memory has been exchanged, the process proceeds to step S63. When no such information has been exchanged, the content transfer processing to the live distribution application program from step S19 onward is terminated, and the process proceeds to step S20.

In step S63, the content such as the facial image sent from the client terminal 12 is obtained. In step S64, the details of the content such as image data including the facial image or text data obtained in step S63 are stored in the shared memory. In step S65, a memory region allocated as the shared memory in the RAM 21 is freed (closed), and the process returns to step S20.

As discussed above, in the user terminal 10, a series of processes is performed by the communication application program. By performing the above-described series of processes by the communication application program, the user terminal 10 receives content sent from the client terminal 12 and transfers the content to the live distribution application program.

(7) Processing by Live Distribution Application Program

With reference to the flowchart shown in FIG. 19, a description will now be given of a process of inserting content sent from the client terminal 12, which is part of the series of processes executed by the above-described live distribution application program on the user terminal 10. The series of steps described below is implemented by performing, by the CPU 20 of the user terminal 10, various arithmetic operations and by controlling the operation of each component in accordance with the flow of the process written in the communication application program.

Figure 19:
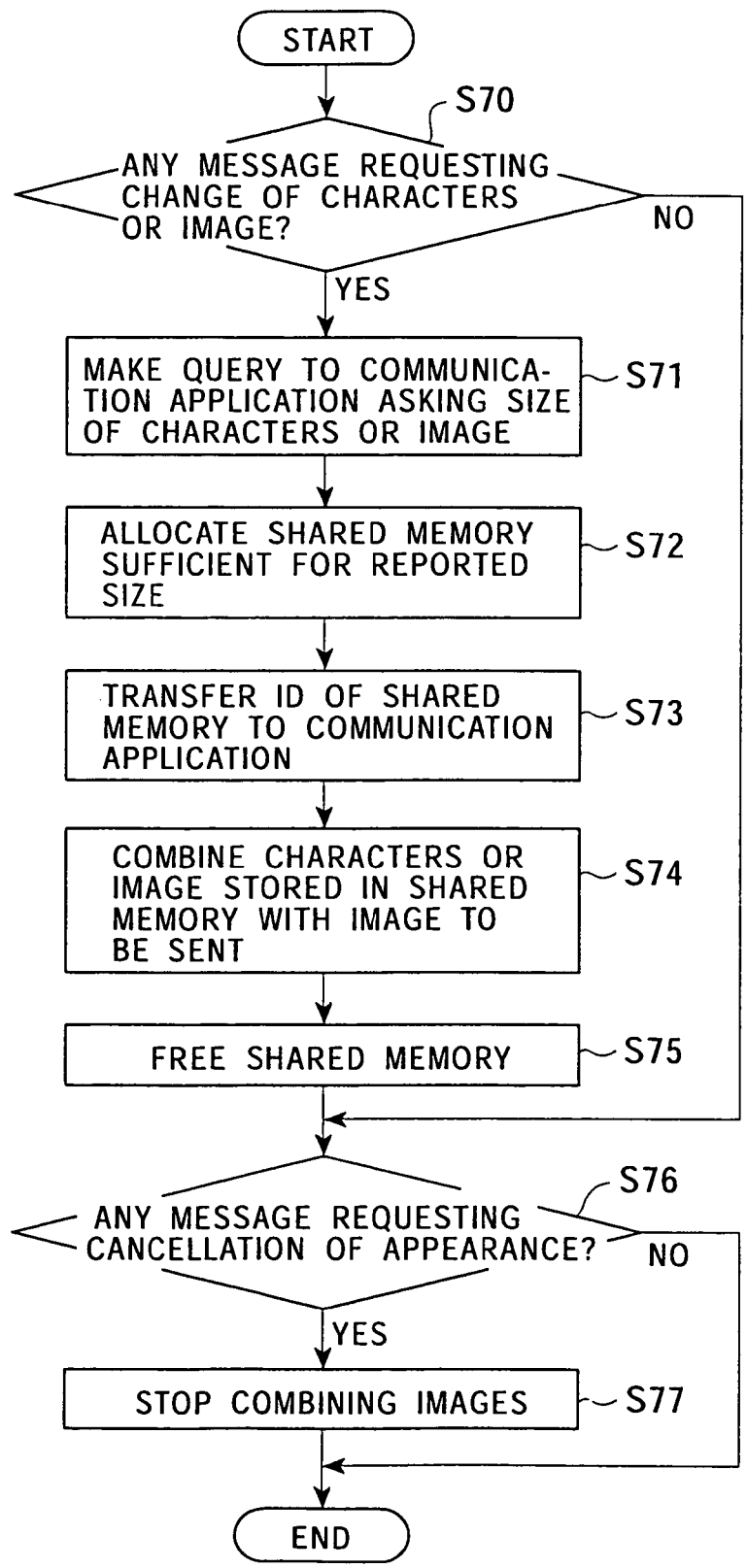
FIG. 19 is a flowchart showing an example of a process of inserting content by the live distribution application program in the content distribution system.

When content sent from the client terminal 12 is to be inserted while the live distribution application program is activated on the user terminal 10, in step S70 of FIG. 19, it is determined whether or not content such as image data or text data has been sent from the communication application program. Step S70 corresponds to the processing in step S18 of the communication application program. When it is determined that the content to be inserted has been sent from that the communication application program, the process proceeds to step S71. When no such content has been sent, the process proceeds to step S76.

In step S71, a query is made to the communication application program asking the size of the content such as text data or image data to be inserted. The processing in step S71 corresponds to the processing in step S60 of the communication application program. After the size of the content to be inserted is obtained from the communication application program, the process proceeds to step S72.

In step S72, the shared memory with a sufficient capacity for storing the content is allocated in the RAM 21 on the basis of the size of the content obtained in step S72.

In step S73, information concerning the allocated shared memory is transferred to the communication application program. The processing in step S73 corresponds to the processing in step S62 of the communication application program.

After the details of the content sent from the client terminal 12 have been stored in the shared memory by the communication application program, in step S74, the content is read from the shared memory and inserted into the program to be distributed live by combining the content with the program. In step S75, the memory region allocated as the shared memory in the RAM 21 is freed, and the process proceeds to step S76.

In step S76, it is determined whether or not a message has been sent from the communication application program requesting the cancellation of the appearance of the participant included in the program to be distributed live. The processing in step S76 corresponds to the processing in step S16 of the communication application program. When it is determined that the message requesting the cancellation of the appearance has been sent, the process proceeds to step S77. When no such message has been sent, the process of inserting the content that has been sent is suspended, and the other processes are continuously performed.

Of various processes in the live distribution application program, the series of steps shown in FIG. 19 corresponds to the process of inserting content that has been sent. The processing from step S70 onward is repeated for a predetermined period of time or at predetermined time intervals while the other various processes are performed.

In step S77, the process of inserting the content that has been transferred from the communication application program is terminated. Live distribution is performed using content stored in advance in the user terminal 10 or content captured by the DV camera 29 included in or connected to the user terminal 10.

(8) Example of Screen When a Plurality of Pieces of Content is Inserted

In the above description, a case has been illustrated in which one of the facial images displayed as a list in the preview areas 71 of the communication window 70 of the user terminal 10 is selected, and the moving image containing the selected facial image inserted therein is distributed live to the client terminals 12.

In the content distribution system 1, when the user terminal 10 obtains pieces of content such as facial images sent from the plurality of client terminals 12 and generates content to be distributed live, the user terminal 10 may insert these pieces of content.

A description will now be given of a case in which live distribution is performed while a plurality of pieces of content is inserted into the original image to be distributed. In this case, for example, in the state shown in FIG. 5, a case in which three of the facial images displayed in the preview areas 71 of the communication window 70 are selected will be described with reference to FIG. 20.

A plurality of facial images can be selected by, for example, individually clicking the facial images displayed as a list in the preview areas 71 by the user of the user terminal 10 using the mouse. Alternatively, for example, an "all participate" button, which is similar to the previously described insertion start button 72, may be displayed near the preview areas 71. When the "all participate" button is selected by the user, all facial images corresponding to users with which sessions have been currently established are inserted in an image to be distributed live.

Figure 20:
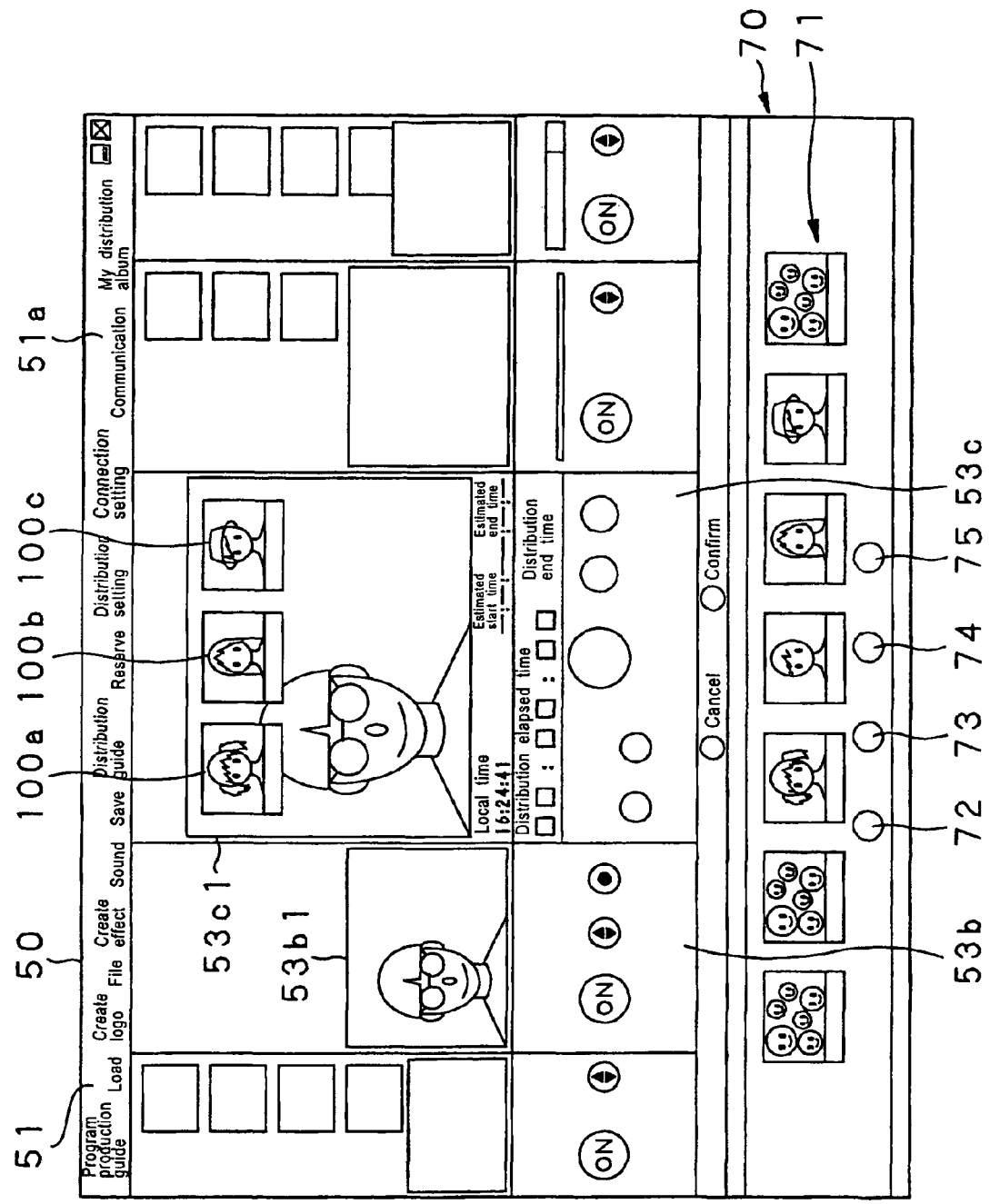
FIG. 20 is a schematic diagram showing an example of the display screen in a case in which a plurality of pieces of content is inserted in the content distribution system.

When the plurality of facial images is selected in this manner, as shown in FIG. 20, the selected facial images are inserted in predetermined positions of the image displayed in the preview area 53c1 of the main monitor panel window 53c. FIG. 20 illustrates a case in which three facial images 100a, 100b, and 100c are selected and inserted in the preview area 53c1.

When the three facial images 100a, 100b, and 100c sent from the client terminals 12 have been inserted in the original image to be distributed, the image to be distributed that contains the inserted images is sent to the streaming distribution server 13 and distributed live to the client terminals 12. Accordingly, the client terminals 12 browse the distributed image containing the three inserted facial images 100a, 100b, and 100c.

As described above, since the content distribution system 1 can perform live distribution by inserting pieces of content that are individually obtained from the plurality of client terminals 12 (facial images 100a, 100b, and 100c) into the image to be distributed, the content distribution system 1 enables, for example, a plurality of users to participate in a program to conduct a discussion or meeting. Live distribution of more diversified and flexible content is thus performed. A specific example of a case in which a discussion or meeting is conducted in this manner will now be described.

Figure 21:
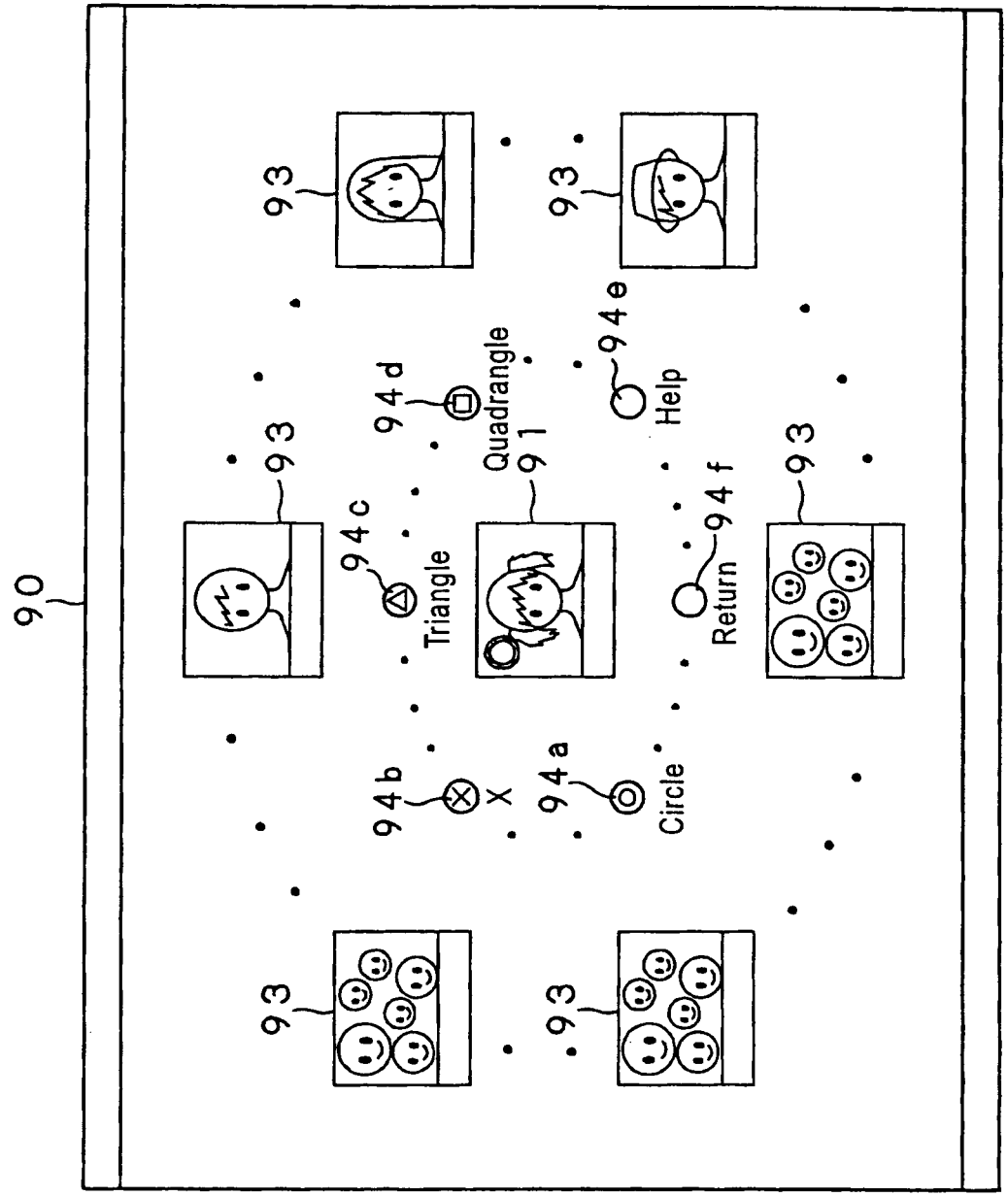
FIG. 21 is a schematic diagram showing an example of a communication window displayed on the display screen of the client terminal in the case in which the plurality of pieces of content is inserted in the content distribution system.

A description will now be given of a case in which the communication application program running on the client terminal 12 has a function of combining various marks (images such as symbols, graphic forms, etc.) with a facial image to be sent to the user terminal 10 and thus sending the combined images. In this case, the communication window 90 displayed by the communication application program on the client terminal 12 is, for example, in a state shown in FIG. 21. The communication window 90 shown in FIG. 21 is similar to that shown in FIG. 7. FIG. 21 shows a state in which a functional module that realizes a mark combining function is running in the communication application program that has a modular structure.

As shown in FIG. 21, buttons 94a to 94f are arranged, in place of the plurality of buttons 92a to 92g shown in FIG. 7, around the self-portrait display area 91. The buttons 94a to 94f correspond to the following functions.

The circle button 94a, the X button 94b, the triangle button 94c, the quadrangle button 94d correspond to functions of combining a "circular" mark, an "X" mark, a "triangular" mark, and a "quadrangular" mark, respectively, with a facial image displayed in the self-portrait display area 91. When one of these buttons is selected by the user, the mark corresponding to the selected-button is combined with the facial image. The facial image containing the combined mark is sent to the user terminal 10. A help button 94e and a return button 94f have functions corresponding to the help button 92d and the return button 92e, respectively, shown in FIG. 7.

Figure 22:
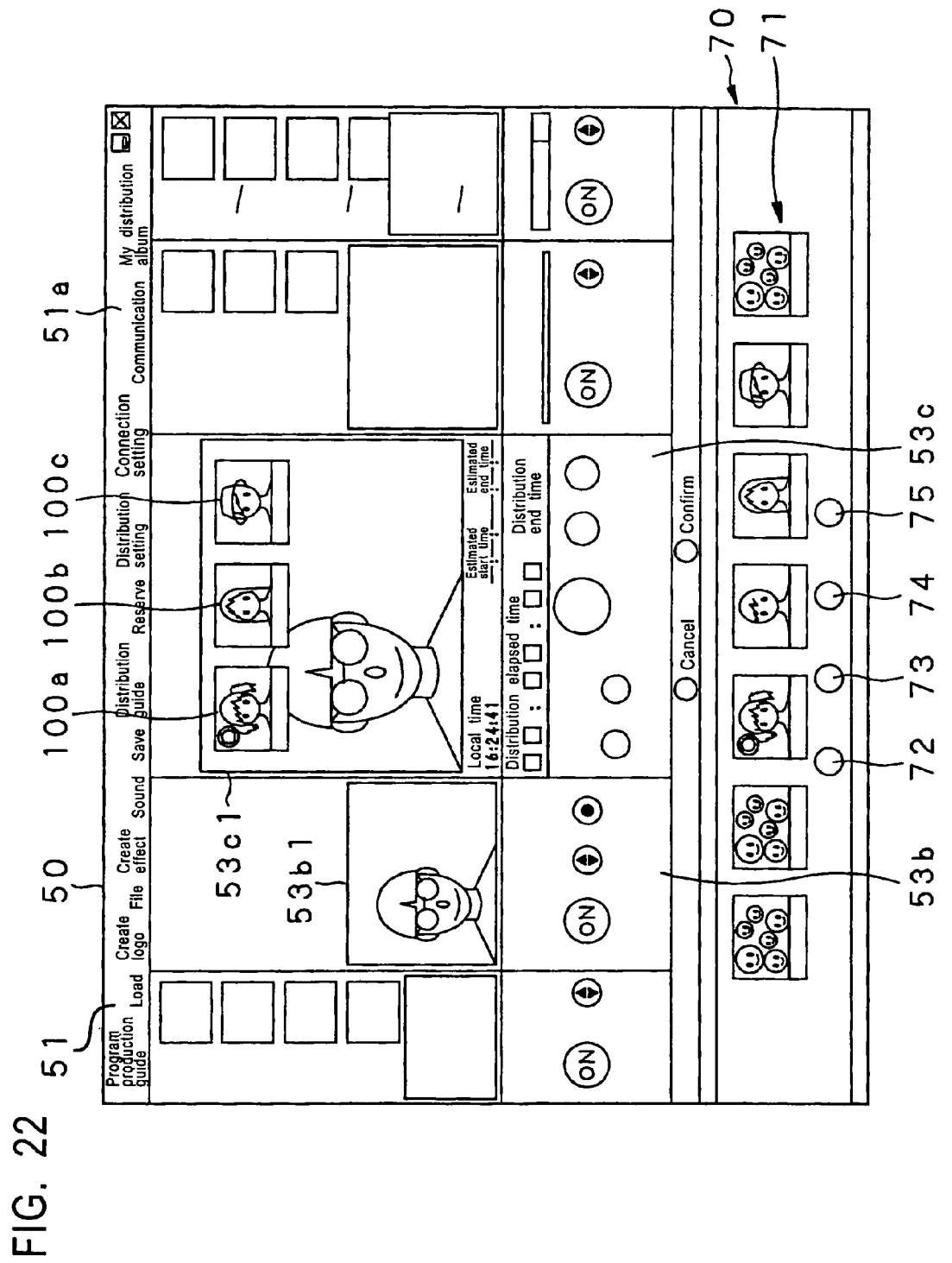
FIG. 22 is a schematic diagram showing an example of the display screen when the client terminal issues a request to combine a facial image with a mark in the case in which the plurality of pieces of content is inserted in the content distribution system.

For example, when the circle button 94a in the communication window 90 shown in FIG. 21 is selected by the client terminal 12, the "circular" mark is combined with the facial image to be sent from the client terminal 12, and the combined images are thus sent to the user terminal 10. The facial image sent in this manner is obtained by the communication application program on the user terminal 10. As shown in FIG. 22, the facial image with the combined "circular" mark is displayed in one of the preview areas 71 of the communication window 70.

Since the live distribution application program obtains the facial image to be inserted from the communication application program, the facial image 100a with the combined "circular" mark is inserted into the original image and displayed in the preview area 53c1 of the main monitor panel window 53c. The image in the preview area 53c1 including the facial image with the combined mark is distributed to the client terminals 12, as described above.

In the content distribution system 1, as described above, various marks can be combined with facial images to be distributed live. For example, participants who are asked by the sender to answer a question specify their corresponding marks, such as "circle", "X", etc., when answering the question. In this manner, a quiz rally, meeting, or discussion can be conducted. A more flexible and diversified audience participation program is easily created and distributed.

A description will now be given of a case in which the user terminal 10 obtains text data sent from the client terminal 12 while a plurality of facial images has been inserted into the original image. The following description corresponds to the case described with reference to FIGS. 10 to 12.

In this case, as described with reference to FIG. 10, when text data (such as the text "Hi!") is input in the communication application program executed on the predetermined client terminal 12, the communication application program on the client terminal 12 sends the text data to the communication application program on the user terminal 10.

Figure 23:
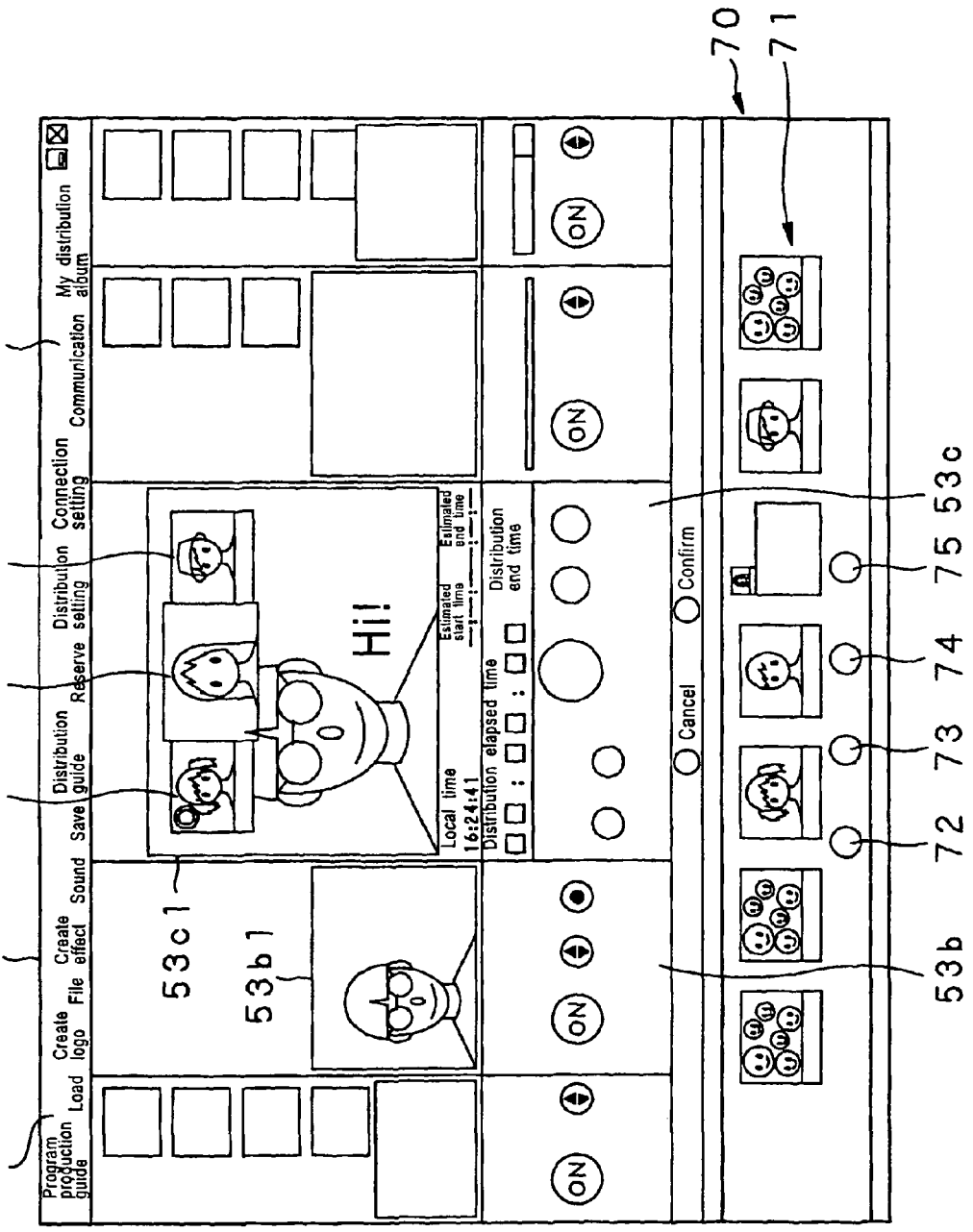
FIG. 23 is a schematic diagram showing an example of the display screen when characters input from a specific participant are combined with the original image and the combined images are distributed in the case in which the plurality of pieces of content is inserted in the content distribution system.

As shown in FIG. 23, the communication application program on the user terminal 10 displays the contents of the obtained text data ("Hi!") at a position corresponding to the facial image corresponding to the client terminal 12 (or a position adjacent to the facial image) in the communication window 70.

The live distribution application program obtains the text data from the communication application program. As shown in FIG. 23, the live distribution application program inserts the text data "Hi!" in the preview area 53c1 and displays the facial image with the text data.

Preferably, the live distribution application program applies a predetermined effect, such as enlargement, to the facial image of the user corresponding to the sending source of the text data that has been inserted (the facial image 100b in this example). Accordingly, which of the users corresponding to the facial images 100a, 100b, and 100c has input the text data inserted in the image to be distributed live can be easily detected. The effect applied to the facial image is not particularly limited to enlargement. The effect is sufficient as long as it enables easy detection of which of the users has input the text data. Such an effect may be, for example, deformation of the facial image, application of a predetermined animation effect, or changing of tone.

(9) Processing when a Plurality of Pieces of Content is Inserted

When live distribution is performed while a plurality of pieces of content is inserted in the above-described manner, with reference to the flowcharts, a series of processes executed by the communication application program on the user terminal 10 will be described in a sequence.

Figure 24:
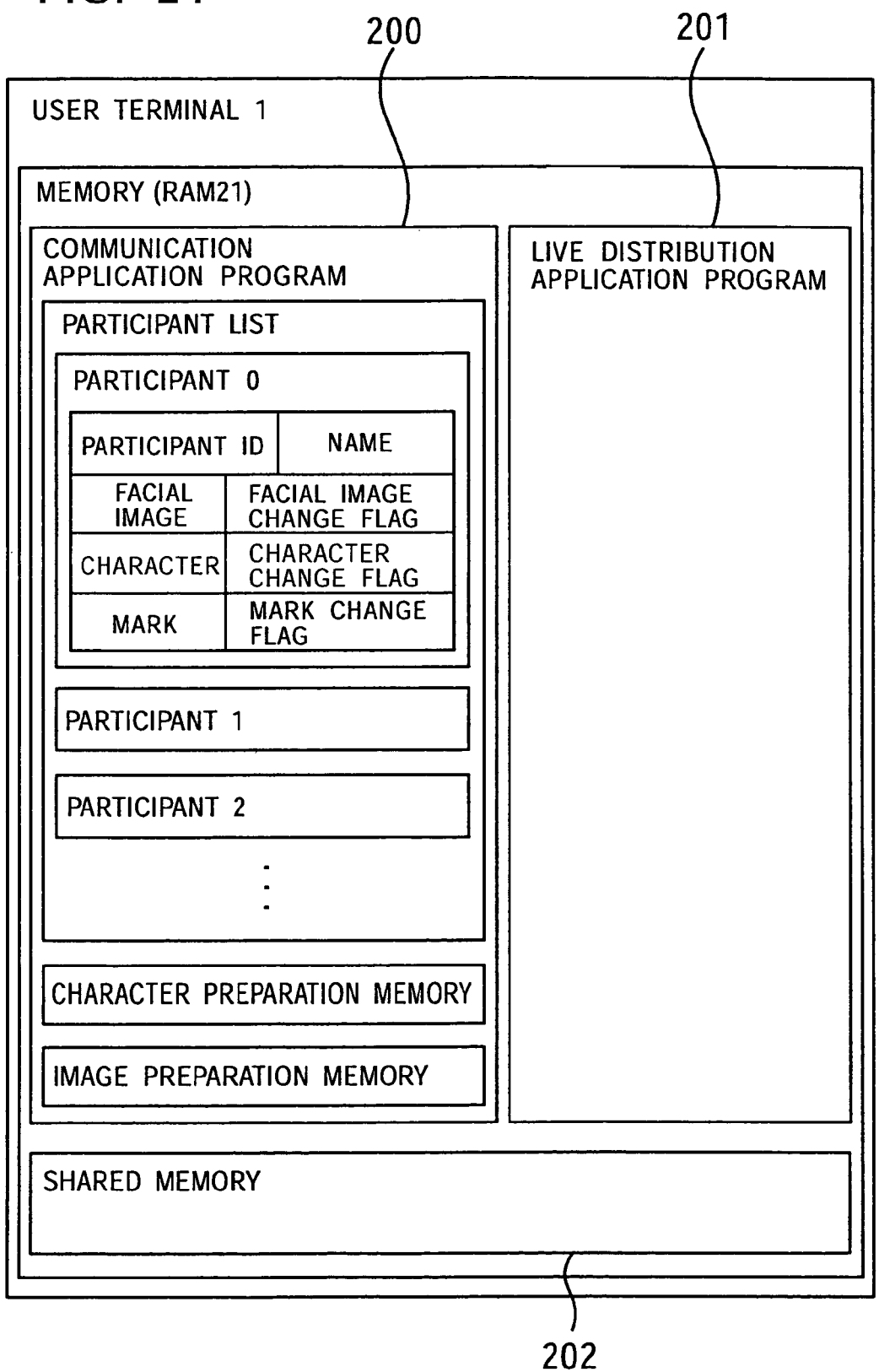
FIG. 24 is a schematic diagram showing the contents of a memory region allocated in a RAM of the user terminal in the case in which the plurality of pieces of content is inserted in the content distribution system.

In the user terminal 10 serving as the sender in the content distribution system 1, the contents of a memory region allocated in the RAM 21 for performing live distribution will now be described with reference to FIG. 24. As shown in FIG. 24, the contents of the memory region are classified into a memory region 200 used as a work area for the communication application program, a memory region 201 used as a work area for the live distribution application program, and a memory region 202 shared by the communication application program and the live distribution application program.

The memory region 200 includes a participant list for storing information concerning users (participants) serving as clients with which sessions have been established by the communication application program and a character preparation memory and an image preparation memory for preparing text data and image data to be transferred to the live distribution application program by obtaining the text data and image data from the client terminals 12. The participant list stores, as shown by "participant 0", "participant 1", "participant 2", . . . in the drawing, a set of pieces of necessary information according to each participant.

The information concerning each participant in the participant list includes, for example, a participant ID for identifying the participant, the name of the participant, a facial image corresponding to the participant, a facial image change flag indicating whether or not the facial image has changed, text data (characters) sent from the participant, a character change flag indicating whether or not the characters have changed, a mark sent from the participant, a mark change flag indicating whether or not the mark has changed, and the like.

Figure 25:
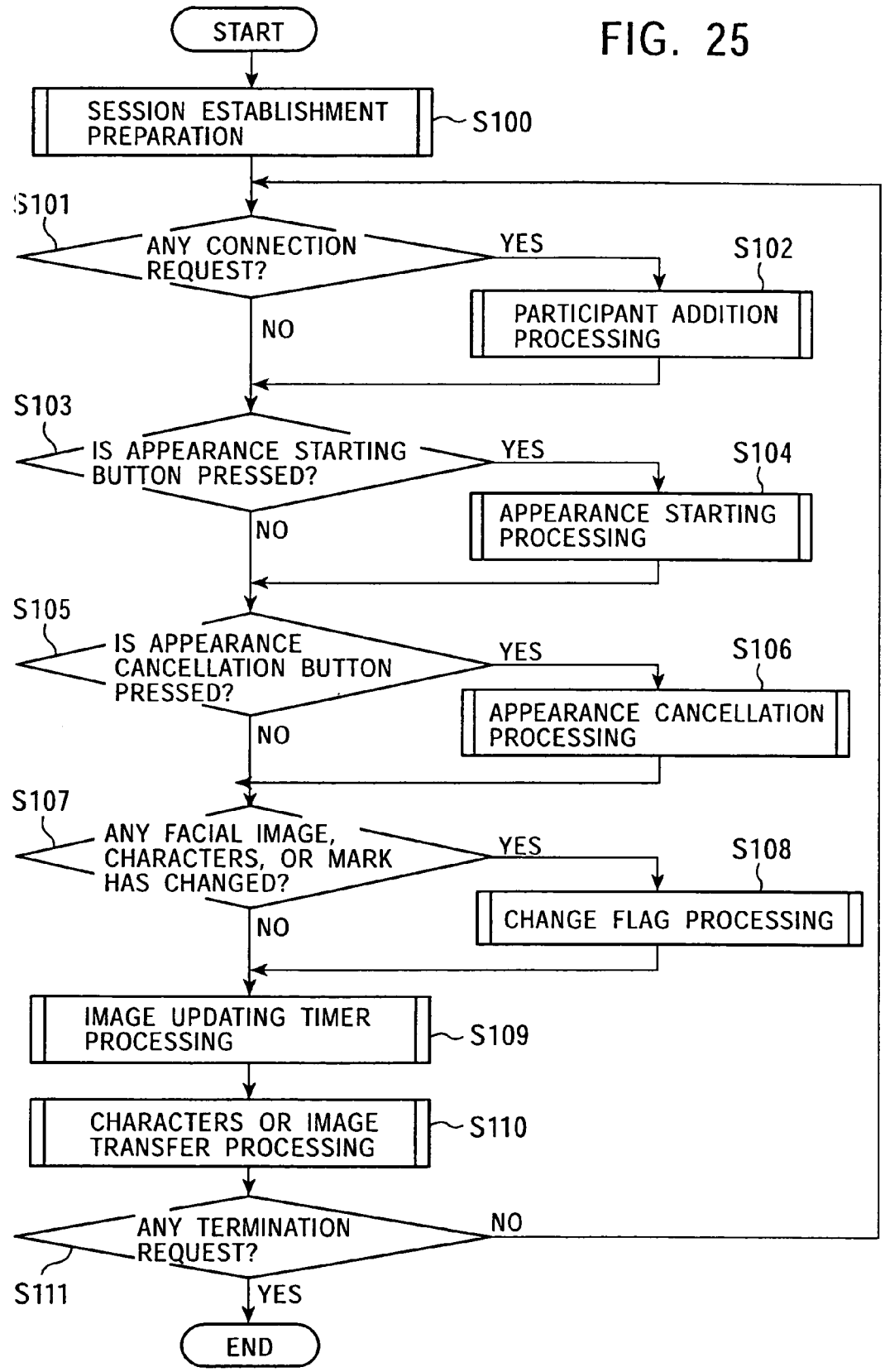
FIG. 25 is a flowchart showing an example of a process performed by the live distribution application program in the case in which the plurality of pieces of content is inserted in the content distribution system.

While the above-described memory regions are allocated in the RAM 21 of the user terminal 10, when the communication application program is activated by the live distribution application program, as shown in step S100 of the flowchart shown in FIG. 25, the communication application program prepares for establishment of a session. In step S100, the communication application program exchanges various pieces of data with the live distribution application program to prepare to obtain content such as a facial image sent from the client terminal 12. Since the processing in step S100 is equivalent to the processing in steps S30 to S32 shown in FIG. 14, a description thereof is omitted in this example.

In step S101, it is determined whether or not a connection request has been received from the communication application program activated on the client terminal 12. In other words, in step S101, it is determined whether or not content such as the facial image 100 has been sent from the client terminal 12. When it is determined that the connection request has been received, the process proceeds to step S102. When no connection request has been received, the process proceeds to step S103.

In step S102, the content such as the facial image 100 sent from the client terminal 12 is added to one preview area 71 of the communication window 70. It is now prepared for a new participant to participate in a program to be sent from the user terminal 10. Since the processing in step S102 is equivalent to the processing in steps S40 to S43 shown in FIG. 16, a description thereof is omitted in this example.

In step S103, it is determined whether or not all users with which sessions have been established by the communication application program are requested to participate in the program to be distributed by the live distribution application program by, for example, selecting the "all participate" button disposed in the communication window 70. When it is determined that all users are requested to participate in the program, the process proceeds to step S104. When not all users have been requested to participate in the program, the process proceeds to step S105.

In step S104, preparation is done to make the user (participant) of each of the client terminals 12 to participate (appear) in the program to be distributed by the live distribution application program. The processing in step S104 will be described in detail later.

In step S105, it is determined whether or not the appearance of each participant who has started to participate in the program in step S104 is requested to be canceled by, for example, selecting by the user the insertion stop button 73 disposed in the communication window 70. When it is determined that the appearance cancellation is requested, the process proceeds to step S106. When the appearance cancellation is not requested, the process proceeds to step S107.

In step S106, the appearance of each participant who has started to participate in the program in step S104 is cancelled. The processing in step S106 will be described in detail later.

In step S107, it is determined whether or not the content sent from the client terminal 12 (such as the facial image, text, mark, etc.) has changed. When it is determined that the content has changed, the process proceeds to step S108. When the content has not changed, the process proceeds to step S109.

In step S108, the change flag(s), namely, the facial image change flag, the character change flag, and/or the mark change flag shown in FIG. 24 is changed. With the processing in step S108, the details of the content inserted in the live distribution application program are updated. The processing in step S108 will be described in detail later.

In step S109, the processing concerning an image updating timer is performed. With the processing in step S109, the content obtained from each client terminal 12 (that is, the facial image, text, mark, etc.) is transferred to the live distribution application program at predetermined time intervals. The processing load on the user terminal 10 is prevented from unnecessarily becoming high. The processing in step 109 will be described in detail later.

In step S110, the content obtained from each client terminal 12 is actually transferred to the live distribution application program. The processing in step S110 will be described in detail later.

In step S111, it is determined whether or not a request to terminate the communication application program is issued by the user that is the sender operating the user terminal 10. When it is determined that termination is requested, the communication application program is terminated by, for example, closing the communication window 70. When termination is not requested, the process returns to step S101, and the above-described series of steps is repeated.

Figure 26:
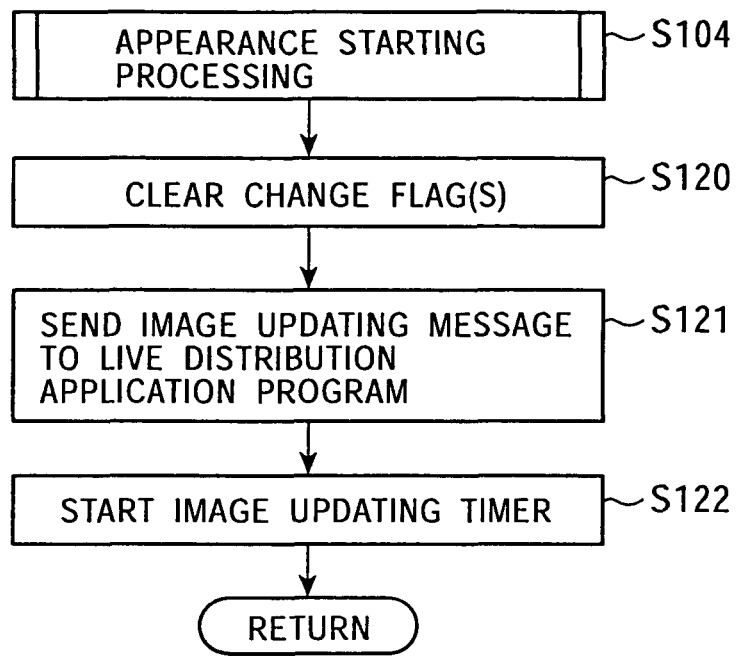
FIG. 26 is a flowchart showing an appearance starting process, which is part of the process performed by the live distribution application program, in the case in which the plurality of pieces of content is inserted in the content distribution system.

With reference to FIG. 26, the appearance starting processing in step S104 described above will now be described.

When the processing in step S104 starts, as shown in step S120 shown in FIG. 26, the change flag(s), namely, the facial image change flag, the character change flag, and/or the mark change flag is initialized (cleared). In step S121, an image updating message is sent to the live distribution application program requesting to update the image to be inserted. In step S122, the image updating timer is started. The image updating timer is a timer for transferring the content obtained from the client terminal 12 to the live distribution application program at predetermined time intervals. For example, the image updating timer is realized by a variable whose count increases at predetermined time intervals. When the processing in step S122 is completed, the process proceeds to step S105.

Figure 27:
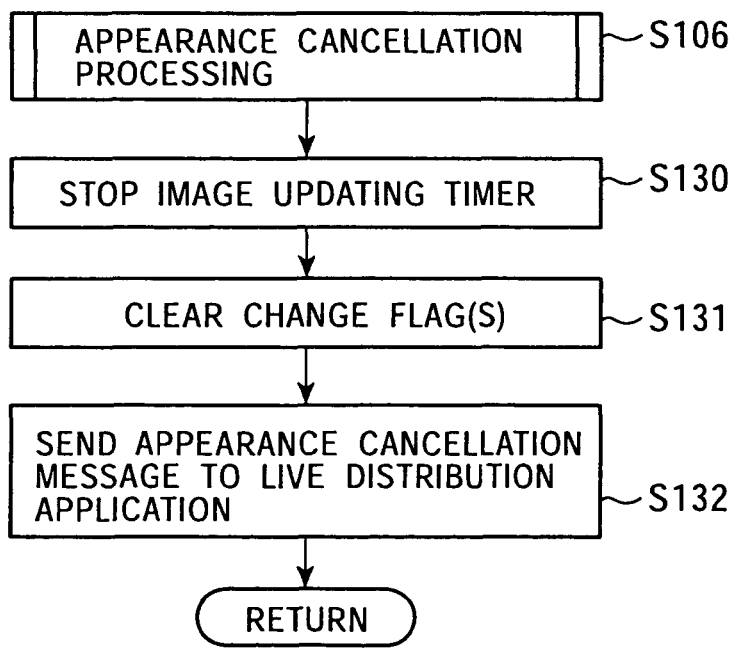
FIG. 27 is a flowchart showing an appearance cancellation process, which is part of the process performed by the live distribution application program, in the case in which the plurality of pieces of content is inserted in the content distribution system.

With reference to FIG. 27, the appearance cancellation processing in step S106 described above will now be described.

When the processing in step S106 starts, in step S130 shown in FIG. 27, the image updating timer is stopped. In step S131, the change flag(s), that is, the facial image change flag, the character change flag, and/or the mark change flag, is cleared. In step S132, a message is output requesting the live distribution application program to cancel the insertion of the content. After the processing in step S132 is completed, the process proceeds to step S107.

Figure 28:
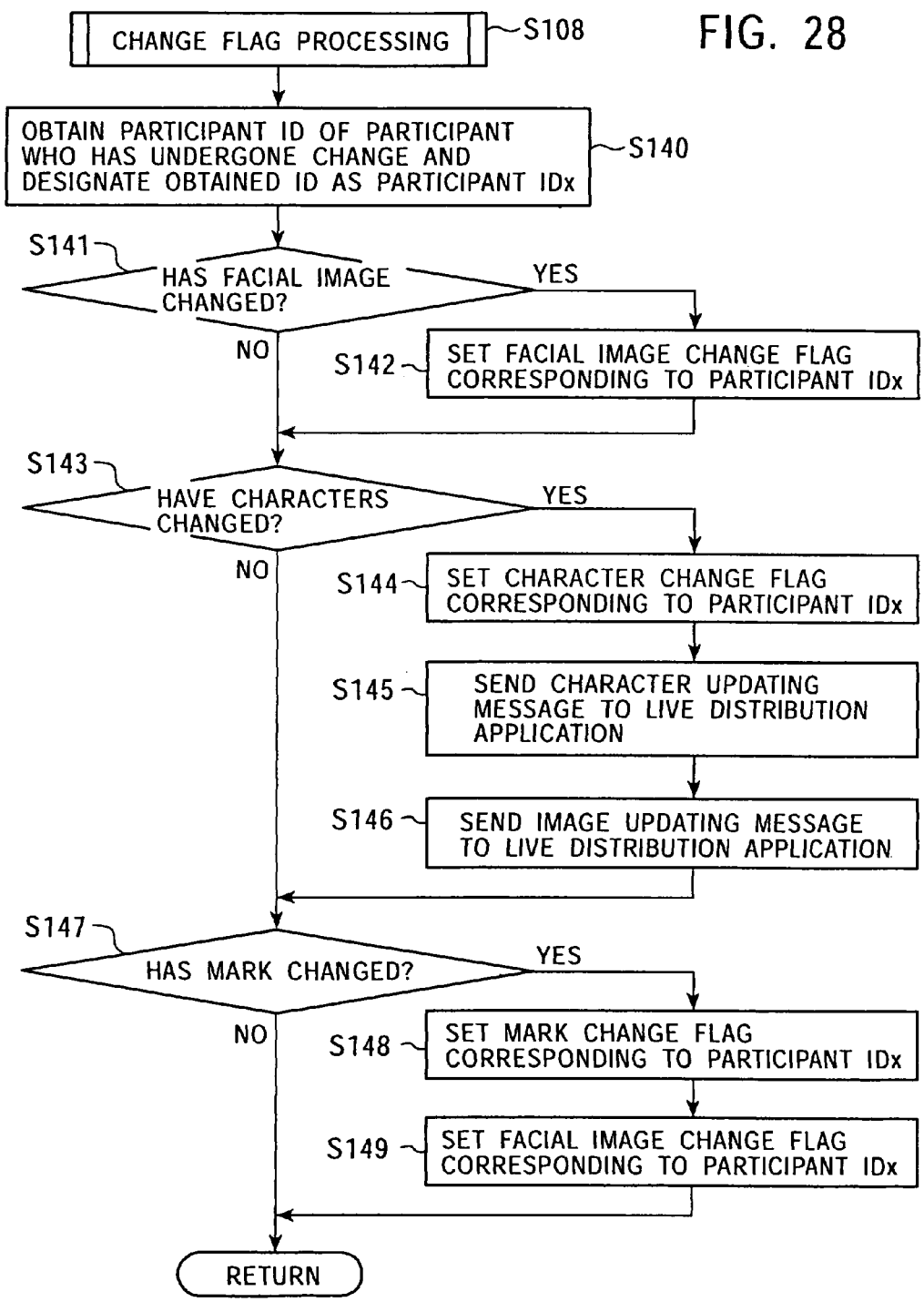
FIG. 28 is a flowchart showing a change flag process, which is part of the process performed by the live distribution application program, in the case in which the plurality of pieces of content is inserted in the content distribution system.

With reference to FIG. 28, the change flag processing in step S108 described above will now be described.

When the processing in step S108 starts, in step S140 shown in FIG. 28, reference is made to the participant list to determine whether or not the facial image, characters, and/or mark of each participant has changed. The participant ID of a participant who has undergone a change is obtained. Hereinafter the obtained participant ID is referred to as the "participant IDx".

In step S141, it is determined whether or not the facial image has changed. When the facial image has changed, the process proceeds to step S142. When the facial image has not changed, the process proceeds to step S143.

In step S142, the facial image change flag corresponding to the participant IDx in the participant list is set. Hereinafter the phrase "the flag is set" refers to changing the value of the flag from "0" to "1". After the processing in step S142, the process proceeds to step S143.

In step S143, it is determined whether or not the characters have changed. When the characters have changed, the process proceeds to step S144. When the characters have not changed, the process proceeds to step S147.

In step S144, the character change flag corresponding to the participant IDx in the participant list is set. In step S145, a character updating message is sent to the live distribution application program indicating that text data (characters) is obtained from the participant and requesting the live distribution application program to combine the characters with an image to be distributed. In step S146, an image updating message is sent to the live distribution application program. After the processing in step S146 is completed, the process proceeds to step S147.

In step S147, it is determined whether or not the mark has changed. When the mark has changed, the process proceeds to step S148. When the mark has not changed, the change flag processing is completed, and the process proceeds to step S109.

In step S148, the mark change flag corresponding to the participant IDx in the participant list is set. In step S149, the facial image change flag corresponding to the participant IDx in the participant list is set. After the processing in step S149 is completed, the change flag processing is completed, and the process proceeds to step S109.

Figure 29:
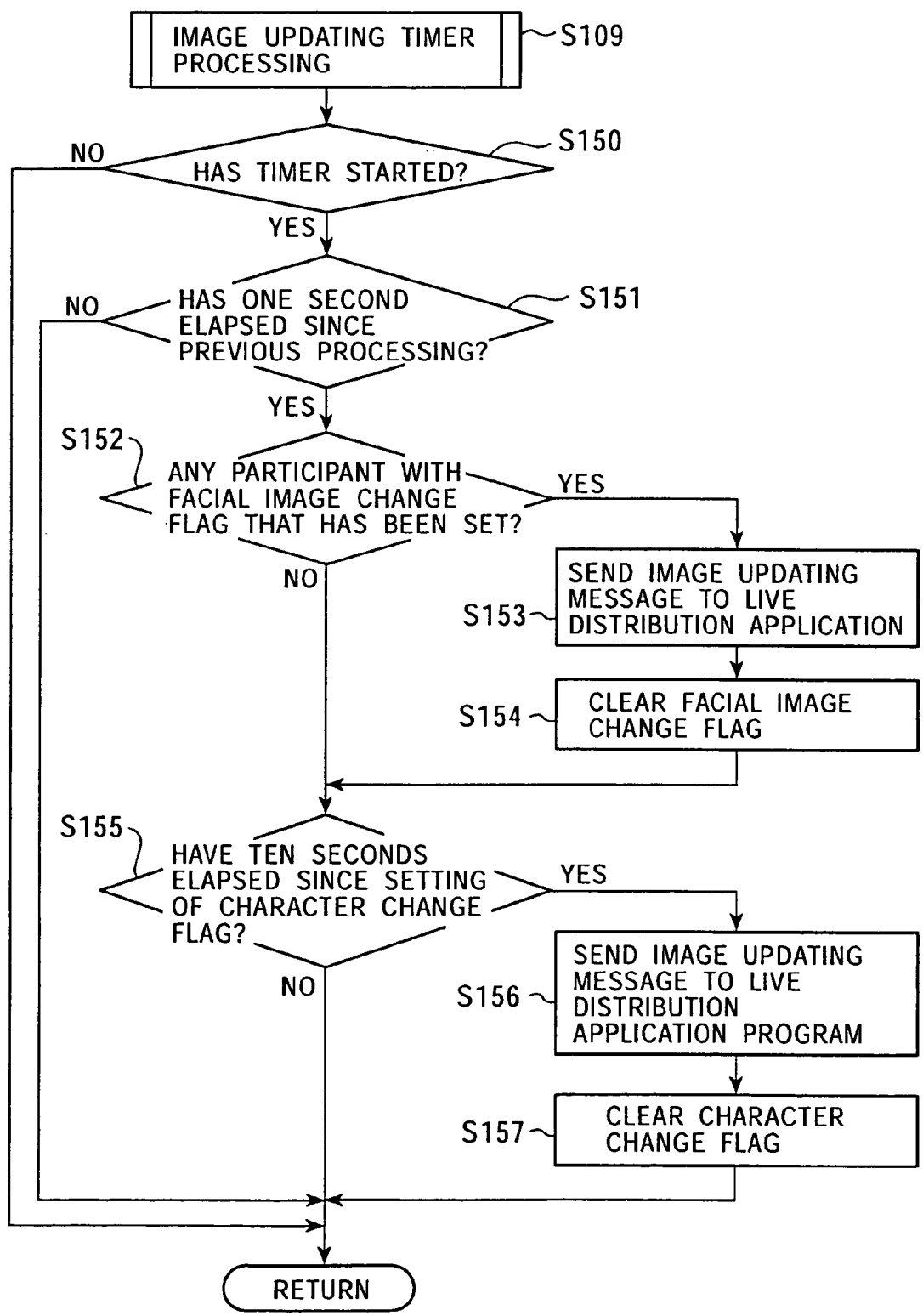
FIG. 29 is a flowchart showing an image updating timer process, which is part of the process performed by the live distribution application program, in the case in which the plurality of pieces of content is inserted in the content distribution system.

With reference to FIG. 29, the image updating timer processing in step S109 described above will now be described.

When the processing in step S109 starts, in step S150 shown in FIG. 29, it is determined whether or not the image updating timer has started. When it is determined that the image updating timer has not started yet, the image to be inserted in the live distribution application program is not to be updated. The image updating timer processing is thus completed, and the process proceeds to step S110. When the image updating timer has started, the process proceeds to step S151.

In step S151, reference is made to the value of the image updating timer to determine whether or not a predetermined period of time (one second in this example) has elapsed since the previous image updating timer processing. When it is determined that the predetermined period of time has not elapsed, the image to be inserted in the live distribution application program is not to be updated. The image updating timer processing is thus completed, and the process proceeds to step S110. When the predetermined period of time has elapsed, the process proceeds to step S152.

In step S152, reference is made to the participant list for any participant having a facial image change flag that has been set. When it is determined that there is such a participant, the process proceeds to step S153. When there is no such a participant, the process proceeds to step S155.

In step S153, an image updating message is sent to the live distribution application program. In step S154, the facial image change flag in the participant list is cleared. After the processing in step S154 is completed, the process proceeds to step S155.

In step S155, it is determined whether or not a predetermined period of time (ten seconds in this example) has elapsed since the setting of the character change flag. When it is determined that the predetermined period of time has elapsed, the process proceeds to step S156. When the predetermined period of time has not elapsed, the process proceeds to step S110. With the processing in step S155, when characters are to be inserted into the original image to be distributed live, the characters are displayed only for the predetermined period of time (ten seconds).

In step S156, an image updating message is sent to the live distribution application program. In step S157, the character change flag in the participant list is cleared. After the processing in step S157 is completed, the process proceeds to step S110.

Figure 30:
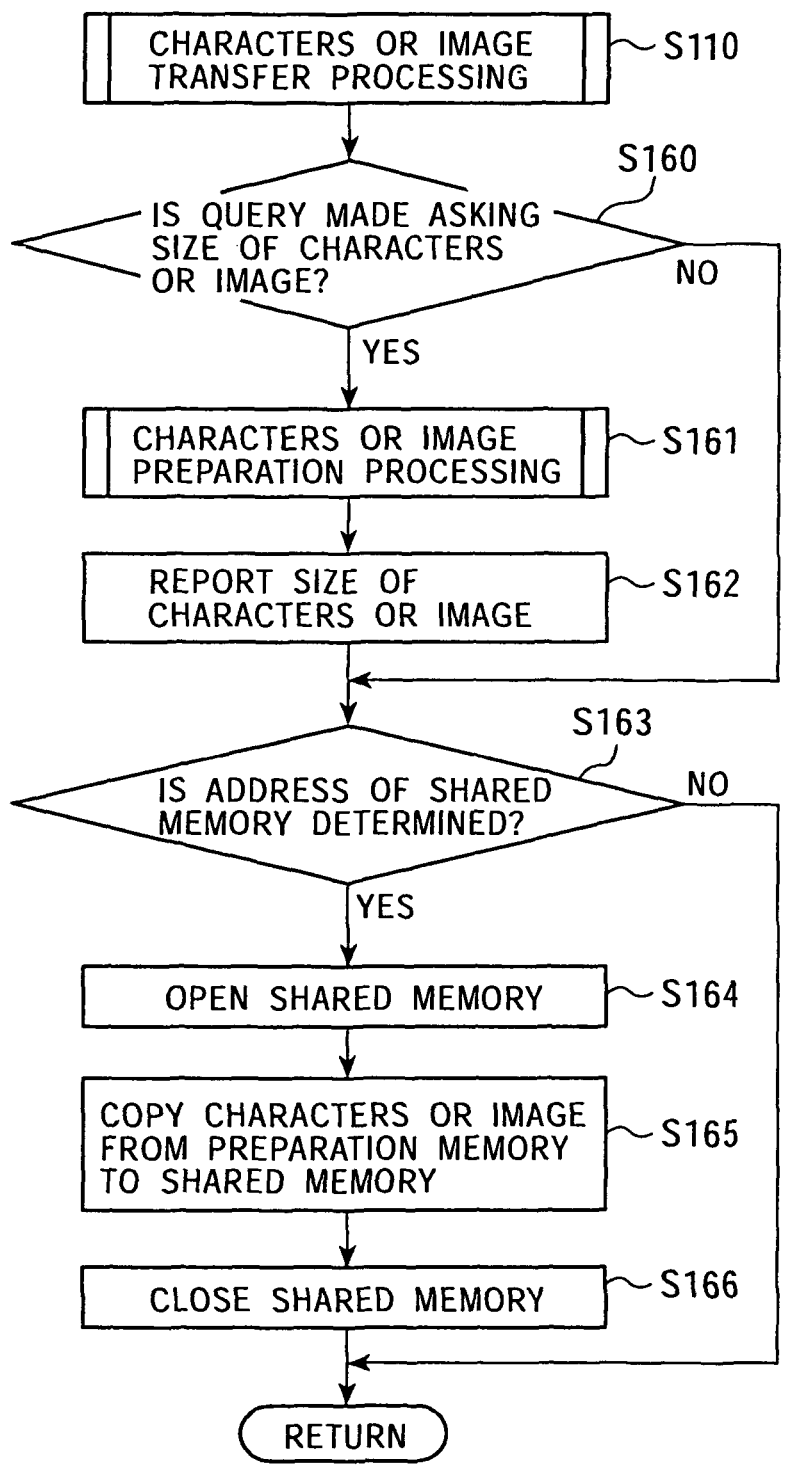
FIG. 30 is a flowchart showing a process of transferring content to the live distribution application program, which is part of the process performed by the live distribution application program, in the case in which the plurality of pieces of content is inserted in the content distribution system.

With reference to FIG. 30, the processing in step S110 described above will now be described.

When the processing in step S110 starts, in step S160 shown in FIG. 30, it is determined whether or not a query is made asking the size of text (characters) or the size (such as the numbers of horizontal and vertical pixels) of an image to be inserted into an image to be distributed by the live distribution application program. When it is determined that such a query is made, the process proceeds to step S161. When no such a query is made, the process proceeds to step S163.

In step S161, the processing is performed to prepare characters or an image to be transferred to the live distribution application program. After the processing is completed, the process proceeds to step S162. The processing in step S161 will be described in detail later.

In step S162, the number of the characters or the size of the image to be transferred by the subsequent processing is reported to the live distribution application program. The live distribution application program is thus notified in advance of the number of the characters or the size of the image. After the processing in step S162 is completed, the process proceeds to step S163.

In step S163, address information (information indicating the address of the shared memory or the like) is obtained from the live distribution application program to determine whether or not the address of the shared memory that is used to transfer content, such as characters or an image, between the communication application program and the live distribution application program has been set. When it is determined that the address has been set, the process proceeds to step S164. When the address has not been set, the content transfer is terminated, and the process proceeds to step S111.

In step S164, the shared memory is made accessible (opened) on the basis of the set address. In step S165, the characters or image to be transferred from the communication application program to the live distribution application program is transferred (copied) from the character preparation memory or the image preparation memory to the shared memory. In step S166, the access to the shared memory that has been opened in step S164 is terminated (closed).

As discussed above, by copying the content such as the characters or image to be transferred to the live distribution application program into the shared memory, the live distribution application program can obtain the content that must be obtained from the communication application program by referring to the shared memory. After the processing in step S164 is completed, the process by the communication application program proceeds to step S111.

Figure 31:
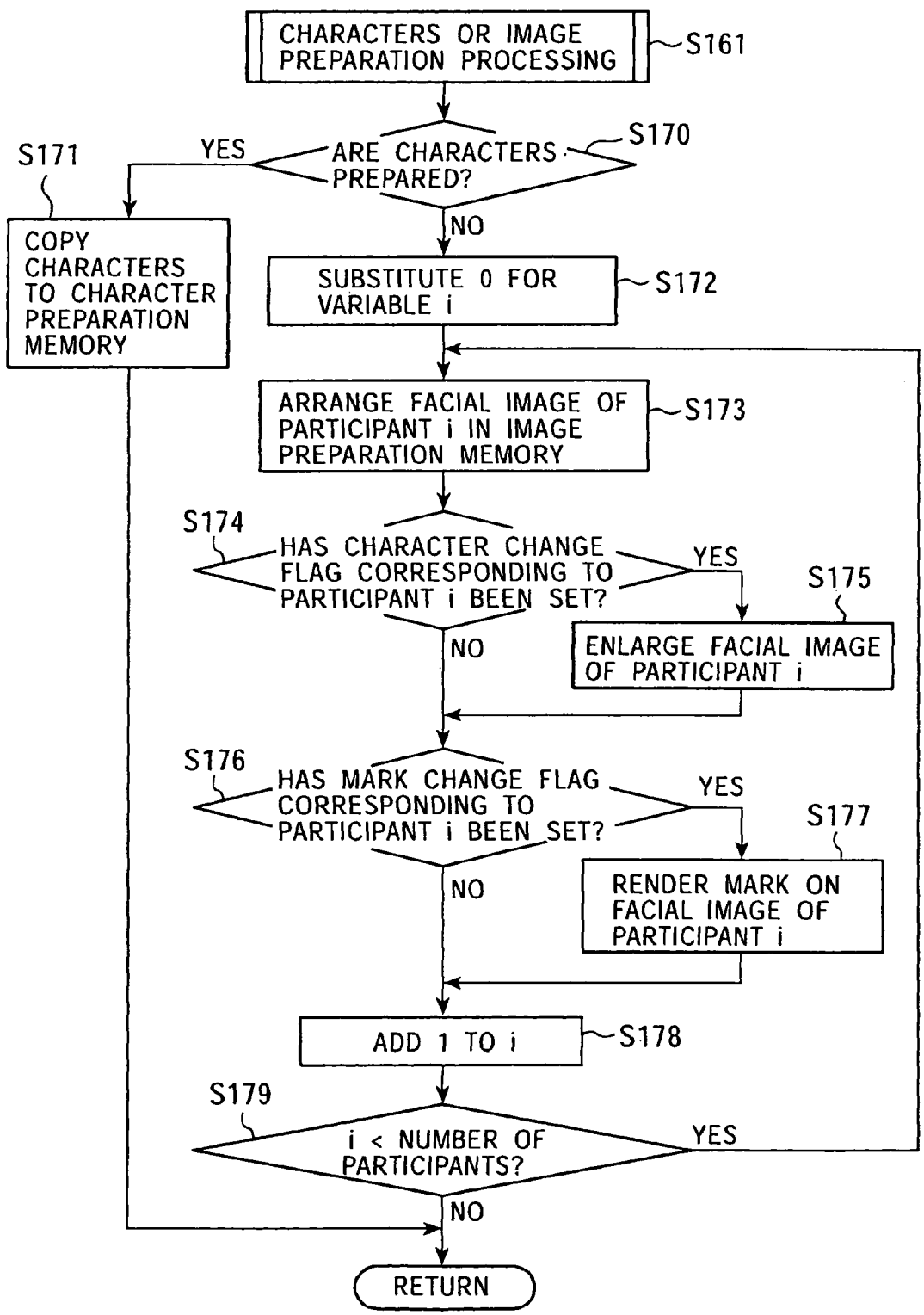
FIG. 31 is a flowchart showing a process of preparing content to be transferred to the live distribution application program, which is part of the process performed by the live distribution application program, in the case in which the plurality of pieces of content is inserted in the content distribution system.

With reference to FIG. 31, the processing in step S161 described above will now be described.

When the processing in step S161 starts, in step S170 shown in FIG. 31, a determination is made whether or not it is prepared for transfer of the characters to the live distribution application program. When it is determined that it is ready, the process proceeds to step S171. When it is not ready, or when it is unnecessary to transfer the characters, the process proceeds to step S172.

In step S171, the text (characters) to be transferred to the live distribution application program is copied to the character preparation memory. After the processing in step S171, the process proceeds to step S162.

In step S172, the value of a variable i used to perform a series of subsequent steps for each participant appearing in the image to be distributed is set to "0". In step S173, reference is made to the participant list to obtain a facial image corresponding to the i-th participant (hereinafter simply referred to as the participant i). The facial image is stored in the image preparation memory.

In step S174, reference is made to the participant list to determine whether or not a character change flag corresponding to the participant i has been set. When it is determined that the character change flag has been set, the process proceeds to step S175. When the character change flag has not been set, the process proceeds to step S176.

In step S175, the facial image of the participant i, which is stored in the image preparation memory, is enlarged. With the processing in step S175, as shown in FIG. 23, the image of the participant serving as the sending source of the characters to be inserted is enlarged and displayed. After the processing in step S175, the process proceeds to step S176.

In step S176, reference is made to the participant list to determine whether or not a mark change flag corresponding to the participant i has been set. When it is determined that the mark change flag has been set, the process proceeds to step S177. When the mark change flag has not been set, the process proceeds to step S178.

In step S177, a predetermined mark is rendered on the facial image of the participant i, which is stored in the image preparation memory. After the processing in step S177, the process proceeds to step S178.

In step S178, "1" is added to the current value of the variable i. In step S179, it is determined whether or not the value of the variable i is less than the number of participants appearing on the program to be distributed, that is, whether or not the processing from step S173 onward has been completed for all participants. When the processing for all participants has not been completed, the process returns to step S173. The processing from step S173 onward is performed for the next participant. When the processing for all participants has been completed, the process proceeds to step S162.

In the content distribution system 1, the communication application program performs the above-described processing to transfer pieces of content obtained by the communication application program from the plurality of client terminals 12 to the live distribution application program. Accordingly, the live distribution application program can insert the plurality of pieces of content into the image to be distributed.

In the foregoing description, after the communication application program has combined together the images of all participants using the image preparation memory, the communication application program transfers the combined images to the live distribution application program. Therefore, the live distribution application program performs two image combining processes. One process involves combining the pre-combined images of all participants with the original image. The other process involves combining text (characters) such as "Hi!" obtained from the communication application program with the original image.

In the content distribution system 1, which of the communication application program and the live distribution application program performs the combining processing and to what extent are arbitrary.

(10) Conclusion

As described above, according to the content distribution system 1, close cooperation between the live distribution application program and the communication application program enables insertion of content that has been sent from the client terminal 12 into content to be distributed live by the user terminal 10. Implementation of the above-described series of processes is not limited to cooperative execution by the live distribution application program and the communication application program. For example, the above-described series of processes may be implemented by a single application program.

In the content distribution system 1 described above, the content sending system includes the user terminal 10 that receives content sent from each of the client terminals 12 and that generates content to be distributed live and the streaming distribution server 13 that distributes the content, which has been generated by the user terminal 10 to be distributed live, to each of the client terminals 12. Alternatively, the user terminal 10 may include a server function of distributing, to the plurality of client terminals 12a, 12b, 12c, . . . , the content to be distributed live. In this case, the user terminal 10 serving as the sender freely uses content such as a moving image, still image, or text provided by each of the client terminals 12 and distributes the content. Messages and opinions can be smoothly exchanged with viewers/listeners of the distributed content.

Alternatively, a software program for instructing a desired electronic apparatus to perform a process corresponding to the processing performed by the above-described communication application program or the live distribution application program may be provided by various types of recording media having stored therein the software program.

According to the present invention, content is directly sent to a sender's apparatus from another apparatus. Content to be inserted into content to be distributed is thus exchanged very smoothly. According to the present invention, the apparatus serving as the sender inserts content that has been sent from a viewer/listener's apparatus into content to be sent and distributes the content. The sender's apparatus freely uses content such as a moving image, still image, or text provided by the viewer/listener's apparatus and distributes the content. Messages and opinions can be exchanged very smoothly between the sender and viewers/listeners of the distributed content.

According to the present invention, content distribution that involves importing a moving image supplied from a provider at a remote place, away from the sender, into a program being distributed live and connecting a plurality of locations by relay technology is easily made possible.

The invention claimed is:

1. An electronic content sending apparatus connected via a network to a server apparatus that distributes content to a plurality of playback apparatuses, said sending apparatus comprising:
 a communication mechanism configured to communicate over a first network communication channel with a network-connected apparatus, said network-connected apparatus being one of the plurality of playback apparatuses; and a controller having a processor programmed to generate the content to be distributed to the plurality of playback apparatuses via the server apparatus,
wherein the controller is contained within the sending apparatus and is configured to
  obtain a first content to be distributed to the playback apparatuses via the server apparatus,
  directly obtain second content from said network-connected apparatus via the first network communication channel, said first network communication channel does not include the server apparatus,
  generate transmission content within said sending apparatus from the first content and the second content, and
  send the transmission content to the server apparatus via a second network communication channel for subsequent distribution from the server apparatus to the plurality of playback apparatuses.

2. The sending apparatus according to claim 1, wherein the controller is configured to obtain the second content from one of the playback apparatuses that also receives the content distributed by the server apparatus connected to the network.

3. The sending apparatus according to claim 1, wherein the controller is configured to send sender specific information for specifying the sending apparatus on the network to the server apparatus, based on a connection request from a network-connected apparatus that has obtained the sender specific information from the server apparatus, establish a connection with said network-connected apparatus, and receive the second content from said network-connected apparatus with which the connection has been established.

4. The sending apparatus according to claim 1, wherein the first content and the second content each include at least one of a moving image, a still image, audio information, and character information.

5. The sending apparatus according to claim 1, wherein the sending apparatus is connected to an image capturing device that captures one of a moving image and a still image, and the controller obtains the first content from the image capturing device.

6. The sending apparatus according to claim 1, wherein the sending apparatus includes an image capturing device that captures one of a moving image and a still image, and the controller obtains the first content from the image capturing device.

7. The sending apparatus according to claim 1, wherein the controller receives, as the second content, one of a moving image and a still image captured by an image capturing device connected to said network-connected apparatus.

8. The sending apparatus according to claim 2, wherein the controller receives, as the second content, one of a moving image and a still image captured by an image capturing device connected to one of the playback apparatuses.

9. The sending apparatus according to claim 1, wherein the controller obtains one of a moving image and a still image as the first content and inserts the second content that has been sent from said network-connected apparatus into a predetermined area of the moving image or the still image serving as the first content.

10. The sending apparatus according to claim 1, wherein the controller obtains pieces of content individually from a plurality of other apparatuses and generates the transmission content by using, as the second content, a piece of content selected from among the pieces of content individually received from the plurality of other apparatuses.

11. A sending method for distributing electronic content to a plurality of playback apparatuses via a server apparatus that distributes the content, comprising:
  a step of obtaining first content at a sending apparatus to be distributed to the playback apparatuses via the server apparatus;
  a step of directly obtaining second content at the sending apparatus, via a first network communication channel that does not include the server apparatus, from a network-connected apparatus connected to the network, said network-connected apparatus being one of the plurality of playback apparatuses;
  a step of generating via a processor in the sending apparatus from the first content and the second content transmission content to be sent to the server apparatus; and
  a step of sending the transmission content from the sending apparatus to the server apparatus via a second network communication channel and subsequently the server apparatus distributing the transmission content to the plurality of playback apparatuses.

12. A non-transitory computer recording medium having processor executable instructions thereon for instructing an apparatus connected via a network to a server apparatus that distributes content and a plurality of playback apparatuses that receive the content distributed by the server apparatus to perform a content sending process, the instructions when executed by a processor perform steps comprising: controlling to obtain first content at the apparatus to be distributed to the playback apparatuses via the server apparatus; controlling to directly obtain second content at the apparatus, via a first network communication channel that does not include the server apparatus, from a network-connected apparatus connected to the network, said network-connected apparatus being one of the plurality of playback apparatuses; generating with a programmed processor transmission content in the apparatus from the first content and the second content, to be sent to the server apparatus; and controlling to send the transmission content to the server apparatus and subsequently the server apparatus distributing the transmission content.

13. An electronic content distribution system connected to a plurality of playback apparatuses via a network, comprising:
  a distribution mechanism configured to send distribution content to the plurality of playback apparatuses; and
  a content generation mechanism configured to generate the distribution content to be distributed to the playback apparatuses via the distribution mechanism, said content generation mechanism configured to send said distribution content to said distribution mechanism via said network over a first network communication channel,
  wherein the content generation mechanism includes a processor programmed to
  obtain first content to be distributed to the playback apparatuses via the distribution mechanism,
  directly obtain second content, from a network-connected apparatus connected to the content generation mechanism via a second network communication channel that does not include the distribution mechanism, said network-connected apparatus being one of the plurality of playback apparatuses,
  generate with a programmed processor the distribution content within the content generation mechanism, from the first content and the second content, and
  send the distribution content to the distribution mechanism over the first network communication channel, and distribute from the distribution mechanism the distribution content generated by the generation mechanism to the plurality of playback apparatuses.

14. The content distribution system according to claim 13, wherein the content generation mechanism and the distribution mechanism are connected to each other via the network; and the first network communication channel and second network communication channel are channels in a same network.

15. The content distribution system according to claim 13, wherein the generation mechanism obtains the second content via the second network communication channel from one of the playback apparatuses that receive the content distributed by the distribution mechanism.

16. The content distribution system according to claim 13, wherein the content generation mechanism performs steps including:

distributing sender specific information for specifying a sender of the distribution content on the network via the distribution mechanism;

establishing, on the basis of a connection request from the network-connected apparatus that has obtained the sender specific information from the distribution mechanism, a connection with said network-connected apparatus; and receiving the second content from said network-connected apparatus with which the connection has been established.

17. An electronic content distribution method for distributing content in a content distribution system including distribution means for distributing the content to a plurality of playback apparatuses and generation means for generating the content to be distributed to the playback apparatuses via the distribution means, the content distribution method comprising:

a step of obtaining first content at the generation means to be distributed to the playback apparatuses via the distribution means;

a step of directly obtaining second content at the generation means via a first network communication channel that does not include the distribution means from a network-connected apparatus connected to the network, said network-connected apparatus being one of the plurality of playback apparatuses;

a step of generating distribution content via a processor contained in the generation means from the first content and the second content, to be distributed to the playback apparatuses via the distribution means;

a step of sending the distribution content to the distribution means over a second network communication channel; and a step of distributing the distribution content generated by the generation means to the plurality of playback apparatuses.

18. A non-transitory computer recording having processor executable instructions thereon for instructing a system including distribution means for distributing content to a plurality of playback apparatuses and generation means for generating the content to be distributed to the playback apparatuses via the distribution means to perform a content distribution process, the instructions where executed by a processor perform steps comprising: obtaining first content at the generation means to be distributed to the playback apparatuses via the distribution means; directly obtaining second content at the generation means from a network-connected apparatus via a first network communication channel that does not include the distribution means, said network-connected apparatus being one of the plurality of playback apparatuses, generating distribution content in the generation means from the first content and the second content to be distributed to the playback apparatuses via the distribution means; sending the distribution content to the distribution means over a second communication channel; and distributing the distribution content generated by the generation means to the plurality of playback apparatuses.

19. An electronic content sending apparatus connected via a network to a server apparatus that distributes distribution content to a plurality of playback apparatuses, said sending apparatus comprising:

means for communicating with a network-connected apparatus via the network; and means for generating the distribution content to be distributed to the plurality of playback apparatuses via the server apparatus, wherein the means for generating obtains a first content to be distributed to the playback apparatuses via the server apparatus, directly obtains second content from said network-connected apparatus connected to the means for generating via a first network communication channel that does not include the server apparatus, said network-connected apparatus being one of the plurality of playback apparatuses, includes in the means for generating a processor programmed to generate the distribution content from the first content and the second content the distribution content to be sent to the server apparatus, and sends the distribution content to the server apparatus for subsequent distribution to the plurality of playback apparatuses.

* * * * *